(12) United States Patent
Jeong et al.

(10) Patent No.: US 10,257,528 B2
(45) Date of Patent: Apr. 9, 2019

(54) METHOD AND APPARATUS FOR ADAPTIVE ENCODING AND DECODING BASED ON IMAGE QUALITY

(71) Applicant: ELECTRONICS AND TELECOMMUNICATIONS RESEARCH INSTITUTE, Daejeon (KR)

(72) Inventors: Se-Yoon Jeong, Daejeon (KR);
Hui-Yong Kim, Daejeon (KR);
Jong-Ho Kim, Daejeon (KR);
Sung-Chang Lim, Daejeon (KR);
Shanglin Yang, Los Angeles, CA (US);
C.-C. Jay Kuo, Los Angeles, CA (US);
Qin Huang, Los Angeles, CA (US)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 226 days.

(21) Appl. No.: 15/287,345

(22) Filed: Oct. 6, 2016

(65) Prior Publication Data

US 2017/0104993 A1 Apr. 13, 2017

(30) Foreign Application Priority Data

Oct. 8, 2015 (KR) .................. 10-2015-0141880
Oct. 4, 2016 (KR) .................. 10-2016-0127739

(51) Int. Cl.
*H04N 19/31* (2014.01)
*H04N 19/154* (2014.01)
*H04N 19/136* (2014.01)
*H04N 19/172* (2014.01)
*H04N 19/132* (2014.01)

(52) U.S. Cl.
CPC ........... *H04N 19/31* (2014.11); *H04N 19/132* (2014.11); *H04N 19/136* (2014.11); *H04N 19/154* (2014.11); *H04N 19/172* (2014.11)

(58) Field of Classification Search
CPC .... H04N 19/31; H04N 19/132; H04N 19/136; H04N 19/154; H04N 19/172
USPC ....................................... 375/240
See application file for complete search history.

(56) References Cited

U.S. PATENT DOCUMENTS

| 8,787,454 B1* | 7/2014 | Chechik ................. G06T 9/20 |
| | | 375/240.01 |
| 9,936,208 B1* | 4/2018 | Brailovskiy ........... H04N 19/42 |
| 2004/0017850 A1* | 1/2004 | Kim ..................... H04N 19/147 |
| | | 375/240.01 |
| 2007/0291841 A1* | 12/2007 | Muraki .................... H04N 7/12 |
| | | 375/240.12 |

(Continued)

*Primary Examiner* — Marnie A Matt
(74) *Attorney, Agent, or Firm* — Kile Park Reed & Houtteman PLLC

(57) ABSTRACT

Disclosed herein are a method and apparatus that adaptively perform encoding and decoding based on image quality. An encoding apparatus may determine optimal Frames Per Second (FPS) for a video and may encode the video based on the determined FPS. Further, the encoding apparatus may provide improved temporal scalability. A decoding apparatus may select a frame to be displayed from among frames of a video depending on a required minimum satisfied user ratio. Through the selection of the frame, the decoding apparatus may provide improved temporal scalability.

20 Claims, 34 Drawing Sheets

(56) References Cited

U.S. PATENT DOCUMENTS

| | | | |
|---|---|---|---|
| 2008/0159403 A1* | 7/2008 | Dunning | G06F 17/30814 |
| | | | 375/240.21 |
| 2009/0147841 A1 | 6/2009 | Chang et al. | |
| 2010/0027663 A1* | 2/2010 | Dai | H04N 7/26 |
| | | | 375/240.16 |
| 2010/0208081 A1* | 8/2010 | Tokutake | H04N 17/00 |
| | | | 348/189 |
| 2011/0110421 A1 | 5/2011 | Seok et al. | |
| 2011/0234894 A1 | 9/2011 | Van Eggelen et al. | |
| 2013/0211803 A1* | 8/2013 | Xu | G06F 17/5018 |
| | | | 703/2 |
| 2016/0105675 A1* | 4/2016 | Tourapis | H04N 19/156 |
| | | | 375/240.02 |
| 2016/0112709 A1* | 4/2016 | Tsukagoshi | H04N 19/70 |
| | | | 375/240.12 |
| 2016/0212434 A1* | 7/2016 | Tsukagoshi | H04N 21/6336 |
| 2017/0078676 A1* | 3/2017 | Coward | H04N 19/172 |

\* cited by examiner

|  | GOP 1 | GOP 2 | GOP 3 |
|---|---|---|---|
| 30 FPS | 80% | 90% | 50% |
| 15 FPS | 70% | 80% | 45% |
| 7.5 FPS | 50% | 50% | 40% |
| REQUIRED IMAGE QUALITY | 75% | | |

FIG.14

| GOP 1 | GOP 2 | GOP 3 |
|---|---|---|
| 30 FPS | 15 FPS | 60 FPS |

FIG.15

```
SEI_Temporal_ID_SURP {
         Surp_value;
}
```

FIG.19

```
SEI_Temporal_ID_SURP {
         Surp_value_idx;
}
```

FIG.20

```
SEI_Temporal_ID_SURP {
For (i=1; i<= Max_Temporl_ID; i++
    Temporal ID[i]=Surp_value_idx;
}
```

FIG.21

METHOD AND APPARATUS FOR ADAPTIVE ENCODING AND DECODING BASED ON IMAGE QUALITY

CROSS REFERENCE TO RELATED APPLICATIONS

This application claims the benefit of Korean Patent Application Nos. 10-2015-0141880, filed Oct. 8, 2015 and 10-2016-0127739, filed Oct. 4, 2016, which are hereby incorporated by reference in their entirety into this application.

BACKGROUND OF THE INVENTION

1. Technical Field

The following embodiments generally relate to an image decoding method and apparatus and an image encoding method and apparatus and, more particularly, to a method and apparatus that adaptively perform encoding and decoding based on the quality of an image.

2. Description of the Related Art

With the continuous development of the information and communication industries, broadcasting services having High-Definition (HD) resolution have been popularized all over the world. Through this popularization, a large number of users have become accustomed to high-resolution and high-definition images and/or videos.

To satisfy users' demands for high definition, a large number of institutions have accelerated the development of next-generation imaging devices. Users' interest in Ultra High Definition (UHD) TVs, having resolution that is more than four times as high as that of Full HD (FHD) TVs, as well as High-Definition TVs (HDTV) and FHD TVs, has increased. As such interest has increased, image encoding/decoding technology for images having higher resolution and higher definition is required.

In new video services such as UHD service, the necessity for a High Frame Rate (HFR) video has increased. For example, a high frame rate may be a frame reproduction rate above 60 Frames Per Second (FPS).

However, in order to provide such an HFR video, a problem may arise in that the amount of video data increases. Further, with the increase in the amount of video data, expense-related problems and technical problems may occur in transmitting and storing video.

Fortunately, due to the visual properties of a human being, HFR is not necessarily required in all situations. For example, most persons cannot perceive the difference in image quality or the degradation of image quality between 30 FPS video and 60 FPS video in a video in which motion is scarcely present.

That is, when FPS is equal to or greater than a specific threshold value depending on the contents of video, most persons may not perceive the difference in image quality due to the cognitive features of a human being even if FPS is further increased.

SUMMARY OF THE INVENTION

An embodiment is intended to provide a method and apparatus that predict the degree of degradation of image quality occurring when an HFR video is converted into a low-frame rate video.

An embodiment is intended to provide a method and apparatus that reduce the bit rate required for encoding by predicting the degree of degradation of image quality.

An embodiment is intended to provide a method and apparatus that minimize the degradation of image quality using information that is generated by predicting the degree of degradation of image quality when the frame rate of a video is converted into a lower frame rate through Temporal Scalability (TS) or the like.

An embodiment is intended to provide a method and apparatus that minimize the degradation of image quality in consideration of information related to the degradation of image quality, together with the generated information, when temporal scalability is applied to a video.

In accordance with an aspect, there is provided a video decoding method, including determining whether to decode at least one frame based on selection information for the frame; and decoding the frame if it is determined to decode the frame.

The determination may be performed on each of multiple frames.

The multiple frames may be frames in a Group Of Pictures (GOP).

The selection information may be related to a proportion of persons who are unable to perceive degradation of video quality even if display of a video including the frame is set such that the frame is excluded from decoding.

The selection information may be related to a proportion of persons who are unable to perceive degradation of video quality even if frames per second (FPS) for display of a video including the frame is determined such that the frame is excluded from decoding.

Determining whether to decode the at least one frame may be performed based on a comparison between a value of the selection information and a value of display information.

The display information may be related to display of a video including the frame.

The display information may be related to FPS for display of the video including the frame.

If a value of the selection information is greater than a value of display information, it may be determined not to decode the frame.

The display information may be related to display of a video including the frame.

The selection information may be included in Supplemental Enhancement Information (SEI) for the frame.

Determining whether to decode the at least one frame may be applied in common to additional frames having a temporal identifier identical to a temporal identifier of the frame, among multiple frames including the frame.

In accordance with another aspect, there is provided a video decoding apparatus, including a control unit for determining whether to decode at least one frame based on selection information for the frame; and a decoding unit for decoding the frame if it is determined to decode the frame.

In accordance with a further aspect of the present invention, there is provided a video encoding method, including generating selection information for at least one frame of a video; and encoding the video based on the selection information.

Encoding the video may include determining whether to encode the frame based on the selection information for the frame; and encoding the frame if it is determined to encode the frame.

Determining whether to encode the frame may be applied in common to additional frames having a temporal identifier identical to a temporal identifier of the frame, among multiple frames including the frame.

The selection information may be related to a proportion of persons who are unable to perceive degradation of video quality even if the frame is excluded from encoding of the video.

The proportion may be calculated via machine learning.

The proportion may be determined based on a feature vector of the frame.

The selection information may include multiple pieces of selection information.

The multiple pieces of selection information may be calculated for respective Frames Per Second (FPS) for display of the video.

A bitstream generated by encoding the video may include the selection information.

The selection information may be applied in common to additional frames having a temporal identifier identical to a temporal identifier of the frame, among multiple frames including the frame.

The selection information may be related to a proportion of persons who are unable to perceive degradation of quality of a displayed video even if display of the video is set such that the frame is excluded from decoding.

BRIEF DESCRIPTION OF THE DRAWINGS

The above and other objects, features and advantages of the present invention will be more clearly understood from the following detailed description taken in conjunction with the accompanying drawings, in which:

FIG. 14 illustrates satisfied user ratios for respective FPSs according to an example;

FIG. 15 illustrates optimal frame rates determined for respective GOPs according to an example;

FIG. 19 illustrates a message containing a satisfied user ratio according to an example;

FIG. 20 illustrates a message containing the index of a satisfied user ratio table according to an example;

FIG. 21 illustrates a message containing all satisfied user ratios according to an example;

DESCRIPTION OF THE PREFERRED EMBODIMENTS

Figure 1:
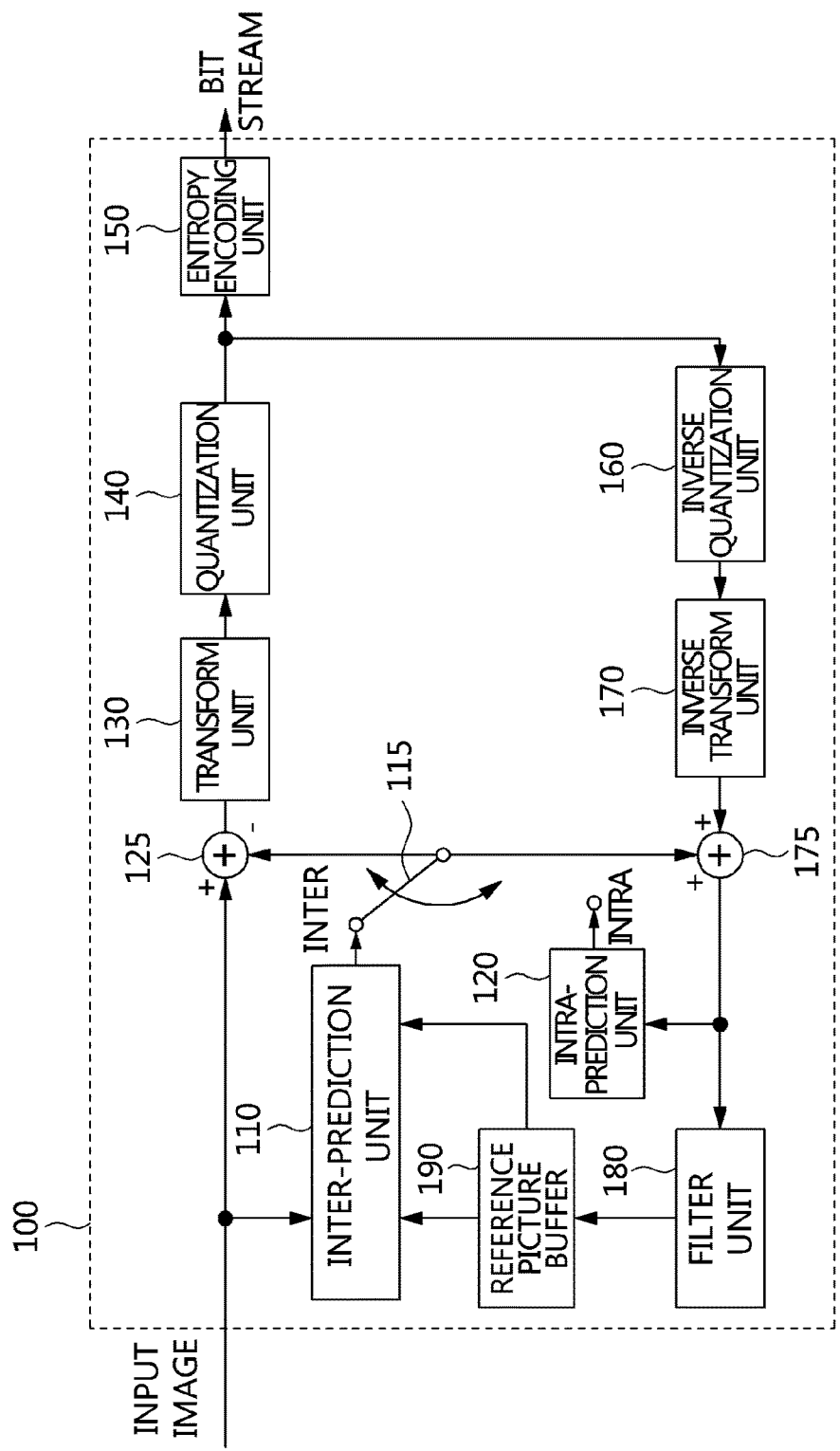
FIG. 1 is a block diagram showing the configuration of an embodiment of an encoding apparatus to which the present invention is applied.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

It will be understood that when a component is referred to as being "connected" or "coupled" to another component, it can be directly connected or coupled to the other component, or intervening components may be present. Further, it should be noted that, in exemplary embodiments, the expression describing that a component "comprises" a specific component means that additional components may be included in the scope of the practice or the technical spirit of exemplary embodiments, but do not preclude the presence of components other than the specific component.

Terms such as 'first' and 'second' may be used to describe various components, but the components are not restricted by the terms. The terms are used only to distinguish one component from another component. For example, a first component may be named a second component without departing from the scope of the present specification. Likewise, a second component may be named a first component.

Also, components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, some components are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted.

Hereinafter, "image" may mean a single picture constituting part of a video, or may mean the video itself. For example, "encoding and/or decoding of an image" may mean "encoding and/or decoding of a video", and may also mean "encoding and/or decoding of any one of images constituting the video".

Below, the numbers values used in the following embodiments are only examples, but may be replaced with values other than values specified in the embodiments.

In the embodiments, information, operations, and functions applied to encoding may also be applied to decoding in a way corresponding to the encoding.

When a frame rate may be adaptively and automatically adjusted using the above-described human visual properties, the amount of video data may be decreased without degrading image quality, from the standpoint of quality perceived (perceptual quality) by a plurality of persons. When human visual properties are applied to an HFR video and respective intervals of video are converted into optimal frame reproduction rates, the increase in the amount of video data may be minimized. Therefore, expense-related problems and technical problems that occur during the procedure for transmitting and storing an HFR video may be solved.

In order to adaptively and automatically adjust the frame rate, the extent of the difference in image quality, appearing when a video is converted from an HFR video into a low-frame rate video, must be able to be accurately predicted. Such prediction technology may be usefully utilized during a preprocessing procedure for video encoding, an encoding procedure, a transmission procedure, and/or a decoding procedure.

However, the difference in image quality, occurring when an HFR video is converted into a low-frame rate video, cannot be accurately predicted using conventional technology.

Further, as conventional technology related to the adjustment of image quality, there is Temporal Scalability (TS) technology. Such TS technology uniformly adjusts the frame rate of a video without considering how the quality of the video will change when TS is applied to the video. Therefore, when TS is applied to the video, a problem arises in that the quality of the video may be greatly degraded.

In the following embodiments, 1) a method for predicting a satisfied user ratio, 2) a method for converting the frame rate of a video into an optimal low-frame rate based on the prediction of the satisfied user ratio, and 3) a method for utilizing information, generated by the prediction of satisfied user ratio, for TS will be described.

1) Method for predicting satisfied user ratio: a satisfied user ratio predictor for predicting the extent of the difference in image quality that occurs when the HFR of a video is converted into a low-frame rate will be described below.

2) Method for converting a video to an optimal low-frame rate based on the prediction of the satisfied user ratio: an encoder for converting a video having fixed HFR to optimal low-frame rates for respective basic decision units using the satisfied user ratio predictor and for encoding the converted video will be described.

3) Method for utilizing information, generated by the prediction of the satisfied user ratio, for TS: a video-encoding stream generated by encoding a video may include information about the satisfied user ratio, generated by the satisfied user ratio predictor. The image quality information may be used for TS during the procedure for transmitting or decoding a video-encoding stream. Improved TS, which was not possible in the conventional technology, may be realized based on the satisfied user ratio information. When TS is applied to a video based on the satisfied user ratio information, how the quality of the video will change may be taken into consideration. By means of this consideration, improved TS for minimizing the degradation of image quality may be provided.

First, the terms used in the embodiments will be described.

Unit: "unit" may denote the unit of image encoding and decoding. The meanings of the terms "unit" and "block" may be identical to each other. Further, the terms "unit" and "block" may be interchanged with each other.

Unit (or block) may be an M×N array of a sample. M and N may be positive integers, respectively. The term "unit" may generally mean a two-dimensional (2D) array of samples. The term "sample" may be either a pixel or a pixel value.

In the encoding and decoding of an image, "unit" may be an area generated by the partitioning of one image. A single image may be partitioned into multiple units. Upon encoding and decoding an image, processing predefined for each unit may be performed depending on the type of unit. Depending on the function, the types of unit may be classified into a macro unit, a Coding Unit (CU), a Prediction Unit (PU), and a Transform Unit (TU). A single unit may be further partitioned into lower units having a smaller size than that of the unit.

Block partition information may include information about the depth of the unit. The depth information may indicate the number of times and/or the degree to which the unit is partitioned.

A single unit may be hierarchically partitioned into multiple lower units while having depth information based on a tree structure. In other words, the unit and lower units, generated by partitioning the unit, may correspond to a node and child nodes of the node, respectively. The individual partitioned lower units may have depth information. The depth information of the unit indicates the number of times and/or the degree to which the unit is partitioned, and thus the partition information of the lower units may include information about the sizes of the lower units.

In a tree structure, the top node may correspond to the initial node before partitioning. The top node may be referred to as a 'root node'. Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

Transform Unit (TU): A TU may be the basic unit of residual signal encoding and/or residual signal decoding, such as transform, inverse transform, quantization, inverse quantization, transform coefficient encoding, and transform coefficient decoding. A single TU may be partitioned into multiple TUs, each having a smaller size.

Prediction Unit (PU): A PU may be a basic unit in the performance of prediction or compensation. The PU may be separated into multiple partitions via partitioning. The multiple partitions may also be basic units in the performance of prediction or compensation. The partitions generated via the partitioning of the PU may also be prediction units.

Reconstructed neighbor unit: A reconstructed neighbor unit may be a unit that has been previously encoded or decoded and reconstructed near an encoding target unit or a decoding target unit. The reconstructed neighbor unit may be either a unit spatially adjacent to the target unit or a unit temporally adjacent to the target unit.

Prediction unit partition: A prediction unit partition may mean a form in which the PU is partitioned.

Parameter set: A parameter set may correspond to information about the header of the structure of a bitstream. For example, a parameter set may include a sequence parameter set, a picture parameter set, an adaptation parameter set, etc.

Rate-distortion optimization: An encoding apparatus may use rate-distortion optimization so as to provide higher encoding efficiency by utilizing combinations of the size of a CU, a prediction mode, the size of a prediction unit, motion information, and the size of a TU.

Rate-distortion optimization scheme: this scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda *R \quad (1)$$

Here, D may denote distortion. D may be the mean of squares of differences (mean square error) between original transform coefficients and reconstructed transform coefficients in a transform block.

R denotes the rate, which may denote a bit rate using related context information.

$\lambda$ denotes a Lagrangian multiplier. R may include not only encoding parameter information, such as a prediction mode, motion information, and a coded block flag, but also bits generated due to the encoding of transform coefficients.

The encoding apparatus performs procedures such as inter-prediction and/or intra-prediction, transform, quantization, entropy coding, inverse quantization, and inverse transform, so as to calculate precise D and R, but those procedures may greatly increase the complexity of the encoding apparatus.

Reference picture: A reference picture may be an image used for inter-prediction or motion compensation. A reference picture may be a picture including a reference unit referred to by a target unit to perform inter-prediction or motion compensation. The terms "picture" and "image" may have the same meaning. Therefore, the terms "picture" and "image" may be interchanged with each other.

Reference picture list: A reference picture list may be a list including reference images used for inter-prediction or motion compensation. The types of reference picture lists may be a List Combined (LC), list 0 (L0), list 1 (L1), etc.

Motion Vector (MV): A MV may be a 2D vector used for inter-prediction. For example, a MV may be represented in a form such as ($mv_x$, $mv_y$). $Mv_x$ may indicate a horizontal component and $mv_y$ may indicate a vertical component.

MV may denote an offset between a target picture and a reference picture.

Search range: a search range may be a 2D area in which a search for a MV is performed during inter-prediction. For example, the size of the search range may be M×N. M and N may be positive integers, respectively.

Basic decision unit: A basic decision unit may denote a basic unit, which is the target to be processed in an embodiment. The basic decision unit may be a plurality of frames, for example, a Group of Pictures (GOP).

Group of Pictures (GOP): The meaning of a GOP in an embodiment may be identical to that of a GOP that is generally used for video encoding. In other words, the start frame of a GOP may be an I frame, and additional frames other than the start frame of the GOP may be either frames which directly refer to the I frame, or frames which indirectly refer to the I frame.

Frame rate: A frame rate may denote the temporal resolution of a video. The frame rate may mean the number of picture(s) that are displayed per second.

Frames per Second (FPS): FPS may be a unit indicating a frame rate. For example, "30 FPS" may mean that 30 frames are displayed per second.

High frame rate (HFR): HFR may denote a frame rate equal to or greater than a predetermined threshold value. For example, based on Korean and U.S. standards, a video having 60 or more FPS may be an HFR video, and based on European standards, a video having 50 or more FPS may be an HFR video. In embodiments, a 60 FPS video is exemplified as an HFR video.

Optimal frame rate: An optimal frame rate may be a frame rate determined according to the contents of a video. The optimal frame rate may be determined for each basic decision unit. Even if the frame rate of a video or a basic decision unit is increased to the optimal frame rate or more, persons may not perceive the difference in image quality achieved by the increase in the frame rate. In other words, the optimal frame rate may be the minimum frame rate at which persons are unable to perceive the degradation of video quality compared to an HFR video. Further, the optimal frame rate may be the FPS immediately higher than the FPS at which the degradation of video quality occurs when the difference in image quality between the original HFR video and a video having a decreased FPS is measured while the FPS of the HFR video is decreased in stages. Here, the occurrence of degradation of image quality may mean that difference in image quality is perceived by a proportion of persons that is equal to or greater than a proportion set by the user or a preset proportion.

Homogenous video: A homogenous video may be a video characterized in that all basic decision units constituting the video are identical or similar to each other.

Image quality degradation perceptual ratio: An image quality degradation perceptual ratio denotes the proportion of persons who are capable of perceiving the degradation of image quality when the frame rate of an HFR video is decreased for each basic decision unit. Typically, the FPS may be successively halved. The unit of image quality degradation perceptual ratio may be percentage (%).

Predictor for image quality degradation perceptual ratio: this predictor may be a predictor for predicting a perceptual ratio for image quality degradation.

Satisfied user ratio: A satisfied user ratio may be the proportion of persons who are satisfied with the quality of a video having a decreased frame rate compared to the quality of an HFR video when the FPS of the HFR video is decreased for each basic decision unit. Alternatively, the satisfied user ratio may be the proportion of persons who are unable to perceive the difference in image quality between the HFR video and the video having a decreased FPS when the FPS of the HFR video is decreased for each basic decision unit.

Typically, FPS may be changed in stages by being repeatedly halved. Here, the proportion of persons may be obtained by representing a value of 1−a/b as a percentage. Here, 'a' may be the number of persons who assess that there is a difference between the image quality of the HFR video and the image quality of the video having a decreased FPS by means of subjective image quality assessment. Further, "b" may be the total number of persons. For example, it is assumed that, for a 60 FPS video and a 30 FPS video, a total of five persons conducted subject image quality assessment, three of the five persons assigned the same quality score to the 60 FPS video and the 30 FPS video, and the remaining two persons assigned a quality score lower than that of the 60 FPS video to the 30 FPS video. In this case, the satisfied user ratio may be 1−2/5=60%. At this time, the image quality degradation perceptual ratio may be 40%. That is, the sum of the satisfied user ratio and the image quality degradation perceptual ratio may be 100%.

Satisfied User Ratio Predictor (SURP): A SURP may be a predictor for predicting a satisfied user ratio. The predictor for an image quality degradation perceptual ratio and the SURP may have similar configurations and operations, and may differ from each other only in output values.

Selection information: In embodiments, image quality information may be either an image quality degradation perceptual ratio or a satisfied user ratio. The term "selection information" may be used to have the same meaning as "perceptual quality information", and these two terms may be interchanged with each other.

Basic Operation of Encoding Apparatus and Decoding Apparatus

FIG. 1 is a block diagram showing the configuration of an embodiment of an encoding apparatus to which the present invention is applied.

An encoding apparatus 100 may be a video encoding apparatus or an image encoding apparatus. A video may include one or more images (pictures). The encoding apparatus 100 may sequentially encode one or more images of the video over time.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference picture buffer 190.

The encoding apparatus 100 may perform encoding on an input image in an intra mode and/or an inter mode. The input image may be called a 'current image', which is the target to be currently encoded.

Further, the encoding apparatus 100 may generate a bitstream, including information about encoding, via encoding on the input image, and may output the generated bitstream.

When the intra mode is used, the switch 115 may switch to the intra mode. When the inter mode is used, the switch 115 may switch to the inter mode.

The encoding apparatus 100 may generate a prediction block for an input block in the input image. Further, after the prediction block has been generated, the encoding apparatus 100 may encode a residual between the input block and the prediction block. The input block may be called a 'current block', which is the target to be currently encoded.

When the prediction mode is an intra mode, the intra-prediction unit 120 may use pixel values of previously encoded neighboring blocks around the current block as reference pixels. The intra-prediction unit 120 may perform spatial prediction on the current block using the reference pixels and generate prediction samples for the current block via spatial prediction.

The inter-prediction unit 110 may include a motion prediction unit and a motion compensation unit.

When the prediction mode is an inter mode, the motion prediction unit may search a reference image for an area most closely matching the current block in a motion prediction procedure, and may derive a motion vector for the current block and the found area. The reference image may be stored in the reference picture buffer 190. More specifically, the reference image may be stored in the reference picture buffer 190 when the encoding and/or decoding of the reference image are processed.

The motion compensation unit may generate a prediction block by performing motion compensation using a motion vector. Here, the motion vector may be a two-dimensional (2D) vector used for inter-prediction. Further, the motion vector may indicate an offset between the current image and the reference image.

The subtractor 125 may generate a residual block which is the residual between the input block and the prediction block. The residual block is also referred to as a 'residual signal'.

The transform unit 130 may generate a transform coefficient by transforming the residual block, and may output the generated transform coefficient. Here, the transform coefficient may be a coefficient value generated by transforming the residual block. When a transform skip mode is used, the transform unit 130 may omit transforming the residual block.

By applying quantization to the transform coefficient, a quantized transform coefficient level may be generated. Here, in the embodiments, the quantized transform coefficient level may also be referred to as a 'transform coefficient'.

The quantization unit 140 may generate a quantized transform coefficient level by quantizing the transform coefficient depending on quantization parameters. The quantization unit 140 may output the quantized transform coefficient level. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or encoding parameter values, calculated in the encoding procedure. The entropy encoding unit 150 may output the generated bitstream.

The entropy encoding unit 150 may perform entropy encoding on information required to decode the image, in addition to the pixel information of the image. For example, the information required to decode the image may include syntax elements or the like.

The encoding parameters may be information required for encoding and/or decoding. The encoding parameters may include information encoded by the encoding apparatus and transferred to a decoding apparatus, and may also include information that may be derived in the encoding or decoding procedure. For example, information transferred to the decoding apparatus may include syntax elements.

For example, the encoding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be a block-based residual signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, a coding method such as exponential Golomb, Context-Adaptive Variable Length Coding (CAVLC), or Context-Adaptive Binary Arithmetic Coding (CABAC) may be used. For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform entropy encoding using the derived binarization method or probability model.

Since the encoding apparatus 100 performs encoding via inter-prediction, an encoded current image may be used as a reference image for additional image(s) to be subsequently processed. Therefore, the encoding apparatus 100 may decode the encoded current image and store the decoded image as a reference image. For decoding, inverse quantization and inverse transform on the encoded current image may be processed.

The quantized coefficient may be inversely quantized by the inverse quantization unit 160, and may be inversely transformed by the inverse transform unit 170. The coefficient that has been inversely quantized and inversely transformed may be added to the prediction block by the adder 175. The inversely quantized and inversely transformed coefficient and the prediction block are added, and then a reconstructed block may be generated.

The reconstructed block may undergo filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an 'adaptive in-loop filter'.

The deblocking filter may eliminate block distortion occurring at the boundaries of blocks. The SAO filter may add a suitable offset value to a pixel value so as to compensate for a coding error. The ALF may perform filtering based on the result of comparison between the reconstructed block and the original block. The reconstructed block, having undergone filtering through the filter unit 180, may be stored in the reference picture buffer 190.

Figure 2:
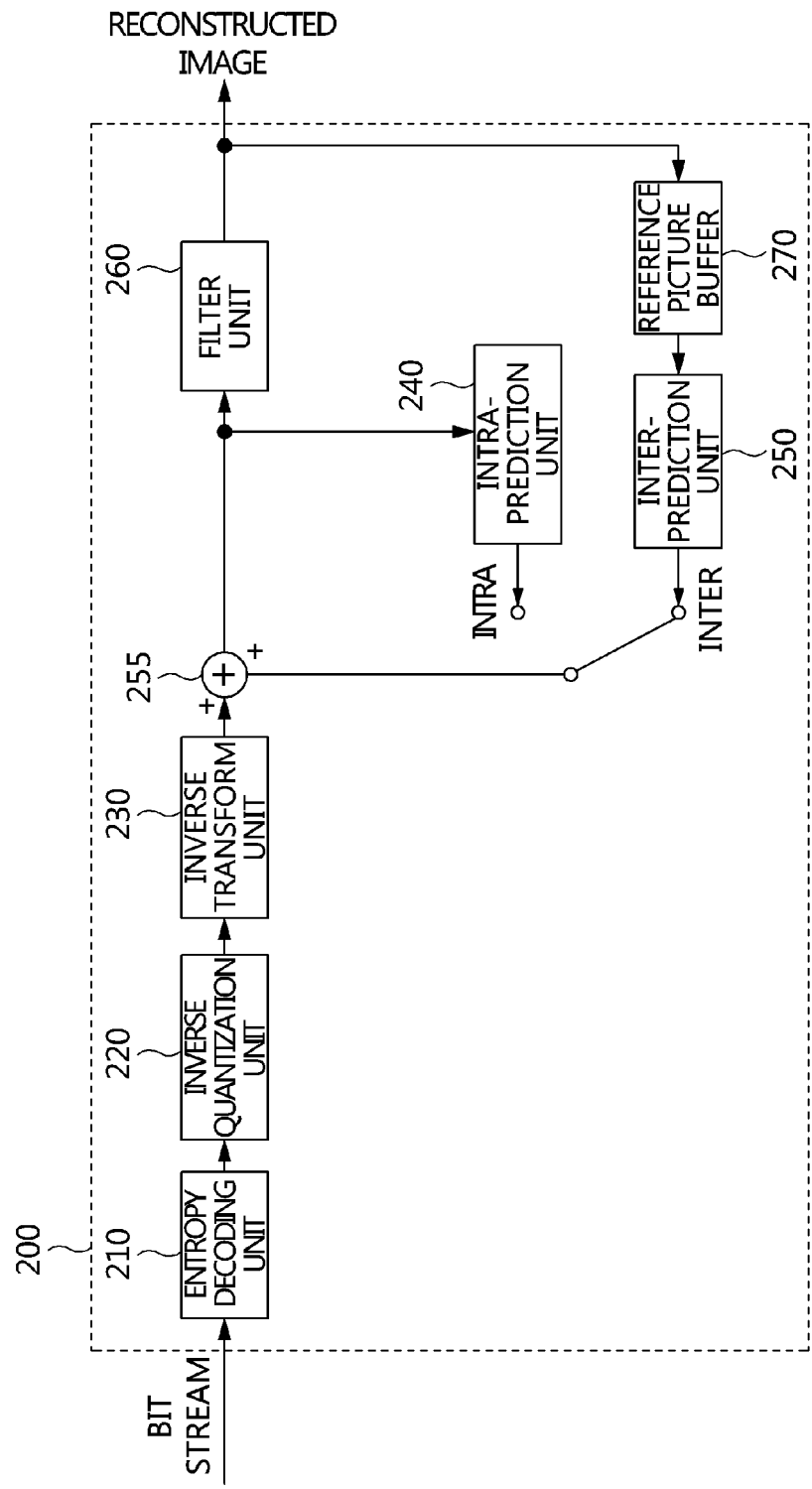
FIG. 2 is a block diagram showing the configuration of an embodiment of a decoding apparatus to which the present invention is applied.

FIG. 2 is a block diagram showing the configuration of an embodiment of a decoding apparatus to which the present invention is applied.

A decoding apparatus 200 may be a video decoding apparatus or an image decoding apparatus.

Referring to FIG. 2, the decoding apparatus 200 may include an entropy decoding unit 210, an inverse quantization unit 220, an inverse transform unit 230, an intra-prediction unit 240, an inter-prediction unit 250, an adder 255, a filter unit 260, and a reference picture buffer 270.

The decoding apparatus 200 may receive a bitstream output from the encoding apparatus 100. The decoding apparatus 200 may perform decoding on the bitstream in an intra mode and/or an inter mode. Further, the decoding apparatus 200 may generate a reconstructed image via decoding and may output the reconstructed image.

For example, switching to an intra mode or an inter mode based on the prediction mode used for decoding may be performed by a switch. When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block from the input bitstream, and may generate a prediction block. When the reconstructed residual block and the prediction block are acquired, the decoding apparatus 200 may generate a reconstructed block by adding the reconstructed residual block to the prediction block.

The entropy decoding unit 210 may generate symbols by performing entropy decoding on the bitstream based on probability distribution. The generated symbols may include quantized coefficient-format symbols. Here, the entropy decoding method may be similar to the above-described entropy encoding method. That is, the entropy decoding method may be the reverse procedure of the above-described entropy encoding method.

The quantized coefficient may be inversely quantized by the inverse quantization unit 220. Further, the inversely quantized coefficient may be inversely transformed by the inverse transform unit 230. As a result of inversely quantizing and inversely transforming the quantized coefficient, a reconstructed residual block may be generated. Here, the inverse quantization unit 220 may apply a quantization matrix to the quantized coefficient.

When the intra mode is used, the intra-prediction unit 240 may generate a prediction block by performing spatial prediction using the pixel values of previously encoded neighboring blocks around a current block.

The inter-prediction unit 250 may include a motion compensation unit. When the inter mode is used, the motion compensation unit may generate a prediction block by performing motion compensation, which uses a motion vector and reference images. The reference images may be stored in the reference picture buffer 270.

The reconstructed residual block and the prediction block may be added to each other by the adder 255. The adder 255 may generate a reconstructed block by adding the reconstructed residual block to the prediction block.

The reconstructed block may undergo filtering through the filter unit 260. The filter unit 260 may apply one or more of a deblocking filter, an SAO filter, and an ALF to the reconstructed block or the reconstructed picture. The filter unit 260 may output the reconstructed image (picture). The reconstructed image may be stored in the reference picture buffer 270 and may then be used for inter-prediction.

Satisfied User Ratio Predictor (SURP)

Figure 3:
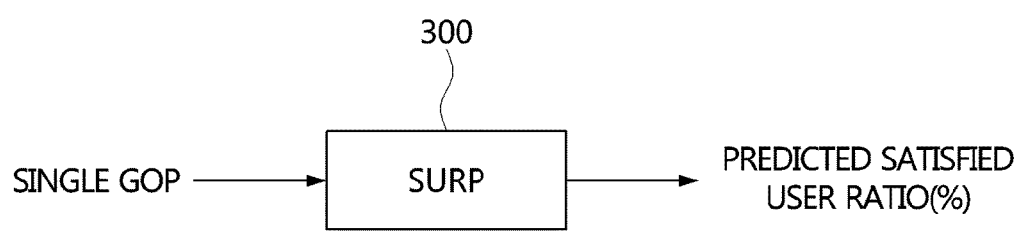
FIG. 3 illustrates the operation of an SURP according to an embodiment.

FIG. 3 illustrates the operation of an SURP according to an embodiment.

The input of an SURP 300 may be a basic decision unit. As shown in FIG. 3, the basic decision unit may be a GOP. The output of the SURP 300 may be a predicted satisfied user ratio for a GOP having a changed FPS.

For example, an input GOP may be a GOP having 8 frames at 60 FPS.

To calculate the predicted satisfied user ratio, the SURP 300 may change the FPS of the GOP. For example, the SURP 300 may convert a GOP having X FPS into a GOP having Y FPS. For example, Y may be aX and 'a' may be ½. Here, "½" is only an exemplary value, and 'a' may have a value of $½^n$ such as ¼, ⅛ or 1/16, where n may be an integer of 1 or more.

X may denote the FPS of the GOP before conversion is made. Y may denote the FPS of the GOP after conversion has been made. When $X=2^n$, Y may be any one of X/2, $X/2^2$, . . . , $X/2^n$. For example, when the value of X is 60, the value of Y may be 30. That is, the GOP may be converted from 60 FPS to 30 FPS.

The predicted satisfied user ratio may be a predicted value for the proportion of persons who are unable to perceive a difference between the image quality of the GOP before conversion is made and the image quality of the GOP after conversion has been made, on the assumption that the FPS of the GOP is changed from 60 to 30 FPS. Alternatively, the predicted satisfied user ratio may be a predicted value for the proportion of persons who are also satisfied with the image quality of the GOP after conversion has been made, compared to the image quality of the GOP before conversion is made on the assumption that the FPS of the GOP is changed from 60 to 30.

The SURP 300 may generate the predicted satisfied user ratio via machine learning.

Hereinafter, a GOP before FPS is changed may be referred to as a 'source GOP'. A GOP after FPS is changed may be referred to as a 'target GOP'. Further, a video before FPS is changed may be referred to as a 'source video'. A video after FPS has been changed may be referred to as a 'target video'.

Considerations for Generation of Predicted Satisfied User Ratio Via Machine Learning In an embodiment, the SURP 300 may use machine learning to measure the degree of image quality degradation occurring due to the change of FPS when changing FPS for each GOP.

For machine learning, training data is required. In other words, ground truth for machine learning may be required. In an embodiment, maintaining human perceptual quality is one of the objects, and thus a method for acquiring data through subjective image quality assessment experiments may be used in order to acquire data about the human perceptual quality.

Here, acquiring data about perceptual quality via subjective image quality assessment may be only an embodiment. Instead of direct measurement of perceptual quality via subjective image quality assessment, the SURP 300 may measure perceptual quality using a measure obtained by modeling perceptual quality. For example, such a measure may be Structural SIMilarity (SSIM) or a Video Quality Metric (VQM).

Typically, as the value of perceptual quality finally acquired as subjective image quality, a Mean Opinion Score (MOS) value is used. When MOS is applied to subjective image quality assessment according to the embodiment, the following problems, presented in 1) to 3), may occur.

1) First, in a conventional scheme for allowing a user to assign a score, references for scores may differ for respective users. Further, even in an assessment procedure for assigning scores, there may occasionally occur the case where the same person assigns different scores to the same video.

2) Second, since the MOS values of videos are different from each other, a problem may arise in that it is difficult to directly use different MOS values for machine learning. In order to solve this problem, the SURP 300 may use relative perceptual quality information instead of MOS. For example, as the relative perceptual quality information, a difference MOS (DMOS) is present. If the difference between the MOS value of a source video and the MOS value of a target video is used for subjective image quality assessment, the results of the subjective image quality assessment may be utilized for machine learning. For such subjective image quality assessment, image quality assessment for a source video may be required in all assessment items, such as Double-Stimulus Continuous Quality-Scale (DSCQS) and Double Stimulus Impairment Scale (DSIS). Therefore, a problem may arise in that the time required for image quality assessment experiments may increase due to this image quality assessment.

3) Third, the conventional quality measurement method recommends that a measurement of 8 or more seconds should be performed for each video sequence. That is, the results of image quality measurement may be regarded as results at a sequence level. When machine learning for determination of a basic decision unit is performed using the results, excellent performance may not be acquired.

Therefore, in an embodiment, a subjective image quality assessment method for acquiring ground truth suitable for machine learning and the conditions of a video sequence used for image quality assessment are proposed.

Machine Learning

The SURP 300 may determine an optimal FPS for each basic decision unit. To determine the FPS for each basic decision unit, ground truth data for such determination must be able to be acquired.

In the following description, a GOP is regarded as a basic decision unit for the convenience of description, and the size of the GOP is set to 8. In other words, a single GOP may include 8 frames. This assumption of the basic decision unit and the size of the GOP is only an example.

The following description related to the acquisition of ground truth and subjective quality assessment may be applied to other types of basic decision units and other sizes of basic decision units in the same or a similar manner.

The subjective quality assessment enables assessment even at the sequence level. In contrast, for machine learning, assessment results for the unit of a GOP are required. To overcome this difference, the length of a video sequence used for quality assessment may be adjusted in order for all GOPs in the video sequence to include only identical or similar content features. In other words, the features of all GOPs in the video may be similar to each other. In an embodiment, a video in which the features of all GOPs are similar to each other may be called a 'homogeneous video'.

The length of the homogeneous video may be restricted to a predefined value. For example, the length of the homogeneous video may be adjusted such that it does not exceed 5 seconds.

Since a homogenous video composed of GOPs having similar features is used, the results of quality assessment acquired at the sequence level may be used as quality information corresponding to each GOP unit. Further, the SURP 300 may improve the performance of the SURP 300 via machine learning which uses such quality information.

Figure 4:
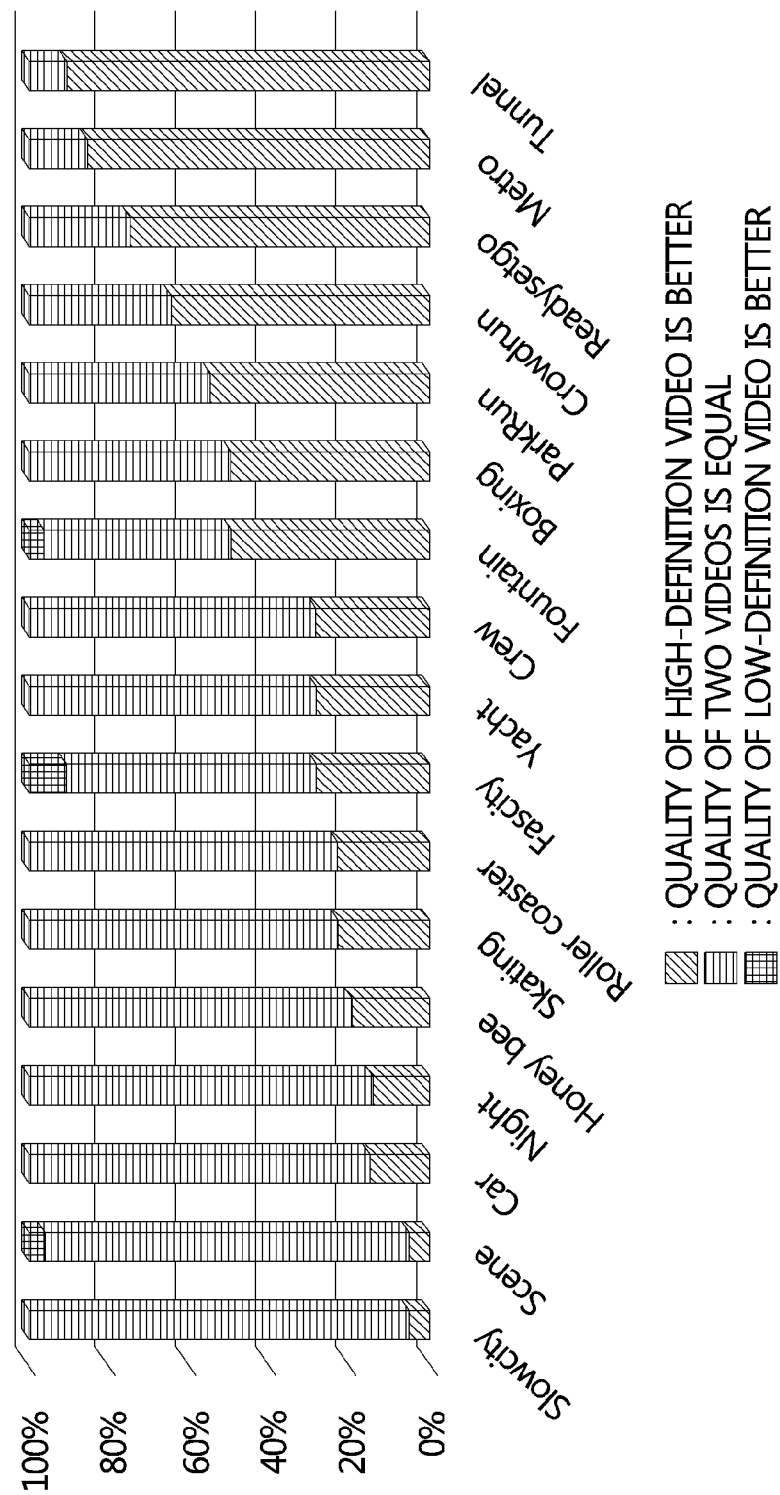
FIG. 4 illustrates the results of image quality assessment according to an example.

FIG. 4 illustrates the results of image quality assessment according to an example.

As an example of subjective quality assessment, a source video may be an HFR video having 60 FPS and may have HD resolution. A target video may be a video having 30 FPS.

The SURP 300 may generate the target video by decreasing the temporal resolution of the source video to 1/n. Here, n may be 2 or $2^m$, and m may be an integer of 1 or more.

The SURP 300 may generate the target video by applying a frame drop to the source video. A frame drop may be the elimination of a predefined frame from the source video. For example, a frame drop may the elimination of even-numbered frame(s) from the frames of the source video.

As a subjective quality assessment method, a pair-wise comparison scheme may be used.

The pair-wise comparison scheme may be a method for showing two videos to each assessor for respective assessment items and asking the assessor which of the two videos has better quality. The assessor may select one of the two videos having better quality for respective assessment items. Alternatively, the pair-wise comparison scheme may ask the assessor whether the first video of the two videos has better quality or the second video has better quality, or whether the two videos have the same quality. In other words, the assessor may select one of three responses for each assessment item. In an embodiment, a scheme for utilizing three responses is exemplified.

The scheme for selecting one of three responses for each assessment item may derive more precise quality assessment results 1) when the quality of two videos is similar and 2) when a relatively small number of assessors participate in experiments.

When image quality is assessed, the sequence in which a high FPS video and a low FPS video are displayed for respective assessment items may be randomly adjusted. Such random adjustment may prevent each assessor from prejudging which of the two videos is a video having higher FPS.

Further, when the length of a video sequence is less than or equal to a predetermined reference value, two videos may be shown to the assessor either twice or two or more times for each assessment item. For example, video A and video B may be shown to the assessor in the sequence of A, B, A, and B.

In FIG. 4, bars on an axis indicate target videos, the quality of which is to be assessed. Character strings below the x axis indicate the titles of the videos. The y axis indicates the proportion of three responses selected by assessors. The three responses are "the quality of the high-definition (i.e. 60 FPS) video of two videos is better", "the quality of the two videos is equal", "the quality of the low-definition (i.e. 30 FPS) video is better". The proportion of the responses that are selected may indicate the ratio of assessors who select each response to all assessors. The unit of the proportion may be percentage (%).

The selection of the response corresponding to "the quality of the two videos is equal" and "the quality of the low-definition video is better" from among the responses may be regarded as the state in which, even after the conversion of a video, the image quality is maintained. In other words, the selection of the responses corresponding to "the quality of the two videos is equal" and "the quality of the low-definition video is better" from among the responses may mean that the quality of the converted video also satisfies the assessors. That is, it may be considered that only assessors who select the response "the quality of the high-definition video is better" were able to perceive the difference in image quality between the two videos.

Therefore, the sum of the proportion of selection of "the quality of the two videos is equal" and the proportion of selection of "the quality of the low-definition video is better" may be used as the "satisfied user ratio" indicating the proportion of persons who are unable to perceive the difference in image quality between the two videos. The unit of "satisfied user ratio" may be percentage (%).

In FIG. 4, 17 video sequences are aligned in descending order of the proportions of persons who are unable to perceive the difference in image quality. Referring to FIG. 4, 75% or more of participants were unable to perceive the difference in image quality between the high-definition video and the low-definition video for 7 video sequences.

Similar to the above description, various target videos may be generated from an HFR source video. For example, the FPS of the target videos may be ¼, ⅛, etc. of the FPS of the source video. The satisfied user ratio may also be measured for each of the target videos and the source video.

The results of subjective quality assessment may be used as ground truth for machine learning. The data quality of ground truth may be improved as the number of assessors is increased. Further, the data quality of ground truth may be improved as the number of video sequences that are targets of assessment is increased.

When DSCQS, other than pair-wise comparison, is used for subjective quality assessment, 1) the case where "the opinion score of the high-definition video is higher than the opinion score of the low-definition video" in DSCQS may correspond to the case where "the quality of the high-definition video is better" in the pair-wise comparison. Further, 2) the case where "the opinion score of the high-definition video is equal to the opinion score of the low-definition video" in DSCQS may correspond to the case where "the quality of the two videos is equal" in the pair-wise comparison. Furthermore, 3) the case where "the opinion score of the high-definition video is lower than the opinion score of the low-definition video" in DSCQS may correspond to the case where "the quality of the low-definition video is better" in the pair-wise comparison. By means of this corresponding relationship, even if DSCQS is used, the satisfied user ratio may be measured in the same way as the above-described pair-wise comparison scheme.

Feature Vector

The SURP 300 may be a predictor using machine learning. As an example of machine learning, the SURP 300 may use a Support Vector Machine (SVM).

When the FPS of a video is changed, a feature influencing the quality of the video must be able to be extracted as a feature vector so as to enable prediction of the degradation of video quality. Below, various feature vector extraction methods that reflect the human visual properties, such as a spatial masking effect, a temporal masking effect, and salient area and contrast sensitivity, are described.

An SVM may generally use a feature vector which more desirably represents information about the input frame required for prediction rather than the entire input frame. That is, the prediction performance of the SVM may be influenced by the selection of information to be used as a feature vector.

In an embodiment, in order for a feature vector to reflect the perceptual quality properties, the feature vector may be designed in consideration of whether a portion of the video slightly or greatly influences the perceptual quality.

For example, a portion of the video that slightly influences perceptual quality may be a portion in which a spatial masking effect is large or a portion in which a temporal masking effect is large. A portion of the video that greatly influences perceptual quality may be a portion in which contrast sensitivity (CS) is high. Further, visual saliency (VS) may also greatly influence perceptual quality. Therefore, even in the design of a feature vector, VS may also be taken into consideration.

Figure 5:
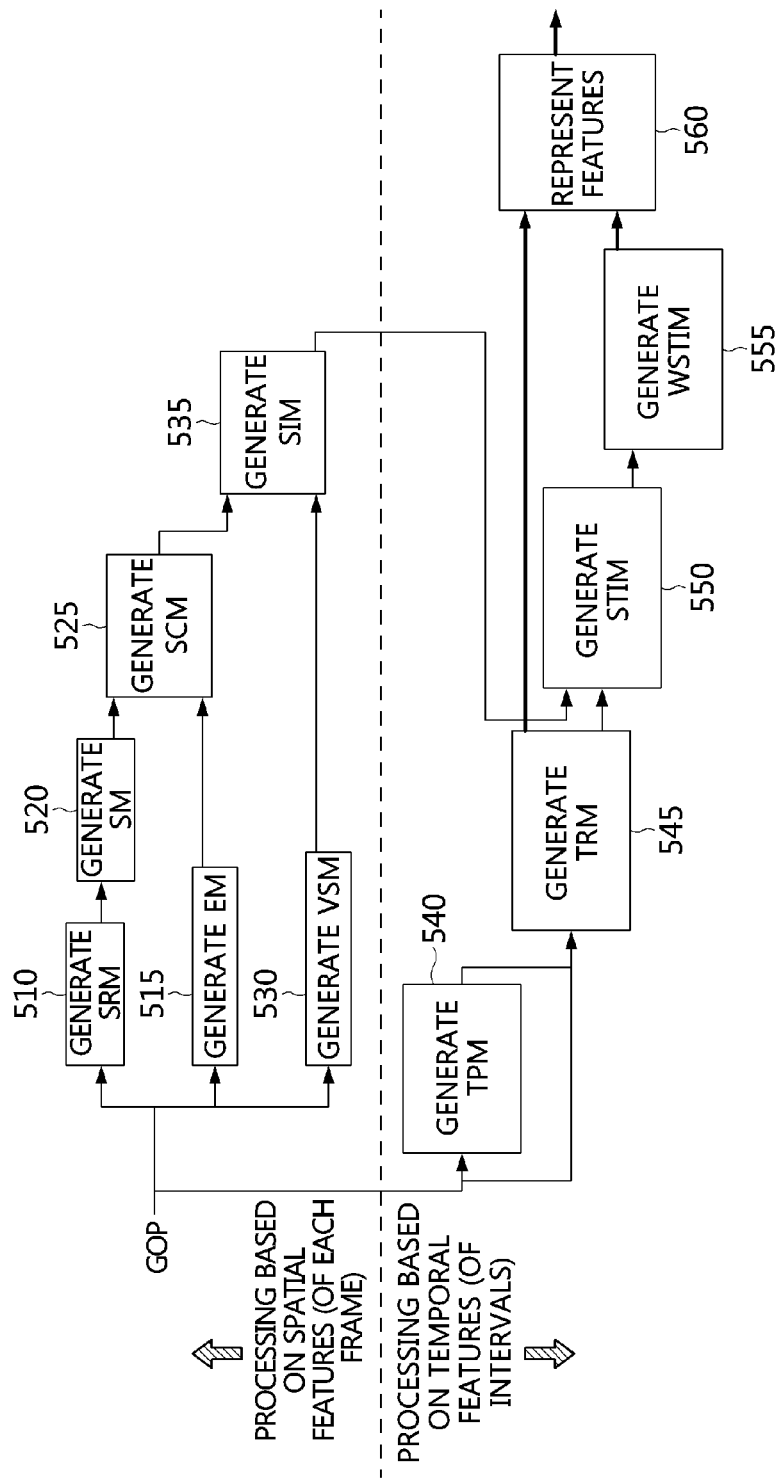
FIG. 5 illustrates a procedure for extracting a feature vector according to an embodiment.

FIG. 5 illustrates a feature vector extraction procedure according to an embodiment.

At step 510, the SURP 300 may generate a spatial randomness map (SRM) for each frame.

In order to reflect a spatial masking effect in a feature vector, an SRM may be used. Generally, an area which is not desirably visually perceived may be an area having high randomness. Therefore, a spatial masking area in the frame may be determined by calculating spatial randomness (SR).

The characteristics of the area having SR may differ from those of other neighboring areas. This difference may indicate that it is difficult to predict the area having SR based on information about neighboring areas. Therefore, to measure SR, a central area Y may be predicted from neighboring areas X, as shown in FIG. 6.

Figure 6:
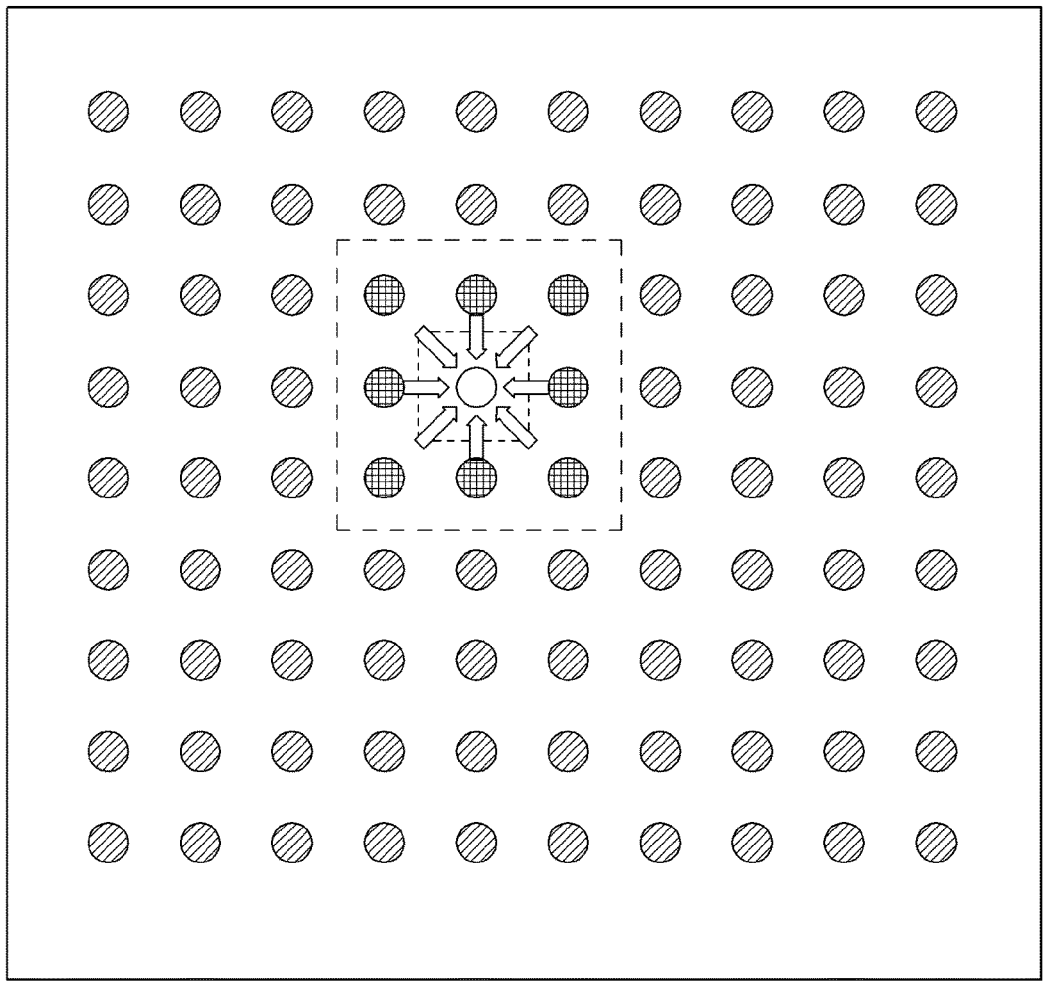
FIG. 6 illustrates a prediction model for measuring spatial randomness according to an example.

FIG. 6 illustrates a prediction model for measuring spatial randomness according to an example.

FIG. 6 shows that a central Y pixel is predicted from neighboring X pixels.

Reference is again to be made to FIG. 5.

Optimal prediction of Y may be represented by the following Equation (2):

$$\hat{Y}=HX(u) \qquad (2)$$

where u denotes a spatial location, and H may be a transformation matrix for providing optimal prediction of a Y value from neighboring X values. When an optimization method based on a minimum mean squared error is used, H may be represented by the following Equation (3):

$$H^*=R_{XY}R_X^{-1} \qquad (3)$$

Here, $R_{XY}$ may be the cross-correlation of X and Y.
$R_X$ may be an autocorrelation matrix of X itself.

An inverse matrix of $R_X$ may be acquired using an approximated pseudo-inverse matrix technique, as given by the following Equation (4):

$$\hat{R}_X^{-1}=U_m\Lambda_m^{-1}U_m^T \qquad (4)$$

Based on the above Equations (2), (3), and (4), the following Equation (5) may be derived.

$$SR(u)=|Y(u)-R_{XY}R_X^{-1}X(u)| \qquad (5)$$

The SURP 300 may acquire SRMs for respective pixels of a frame based on Equation (5).

Figure 7:
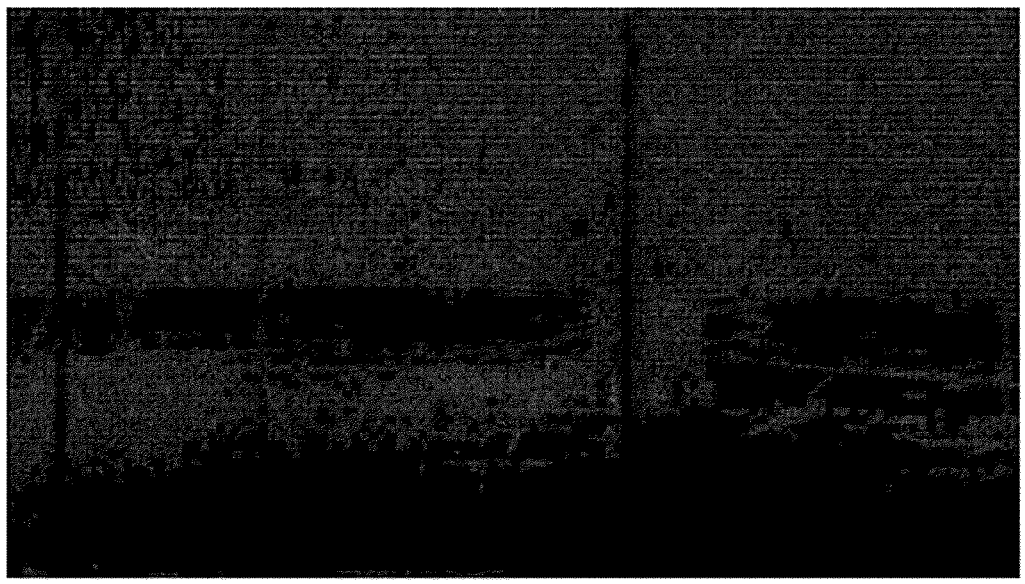
FIG. 7 shows a Spatial Randomness Map (SRM) according to an example.

FIG. 7 illustrates an SRM according to an example.

In FIG. 7, a bright pixel may indicate a pixel that is not easily predicted from neighboring pixels. In other words, a bright pixel may indicate an area having high spatial randomness, that is, an area in which a spatial masking effect is large.

Reference is again to be made to FIG. 5.

At step 515, the SURP 300 may generate an edge map (EM) for each frame.

The SURP 300 may generate the edge map using a Sobel edge operation for each frame.

At step 520, the SURP 300 may generate a Smoothness Map (SM) for each frame.

The SM may be used to determine whether the background of the corresponding frame is a smooth area.

The SURP 300 may calculate the smoothness values of respective blocks in the SRM. The smoothness values of respective blocks may be calculated using the following Equation (6):

$$SM=N_{lc}/W_b^2 \qquad (6)$$

$N_{lc}$ may be the number of pixels having spatial randomness lower than a reference value in a block. Here, the spatial randomness lower than the reference value may indicate low complexity.

$W_b^2$ may denote the area of the block, that is, the number of pixels in the block. For example, $W_b$ may be 32. $W_b$ of 32 may mean that 32×32 blocks are used.

The SURP 300 may generate an SM by setting the values of all pixels in each block to the smoothness value of the corresponding block.

Figure 8:
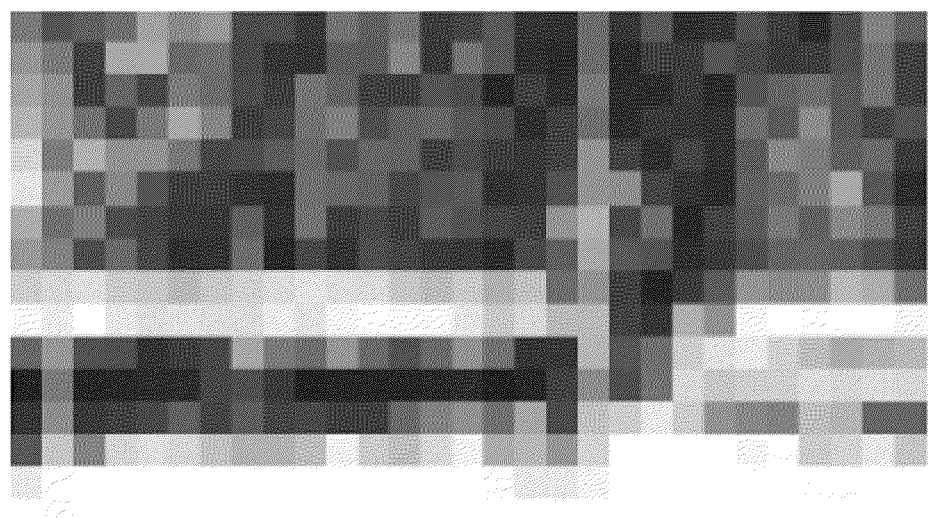
FIG. 8 shows a Smoothness Map (SM) according to an example.

FIG. 8 illustrates an SM according to an example.

In an SM, identical pixel values may be set for respective blocks.

In the SM, the brighter a block, the smoother the background of the block. In other words, a bright block may indicate a smoother background. The edge of a bright block may be more easily perceived than the edge of a dark block.

Reference is again to be made to FIG. 5.

At step 525, the SURP 300 may generate a Spatial Contrast Map (SCM) for each frame.

Stimulus sensitivity may be related to spatial contrast. In order to reflect spatial contrast in a feature vector, an SCM may be used.

The SCM may be acquired by measuring an edge and smoothness. In a smooth background area, a reaction sensitive to stimulus may occur. Here, "stimulus" may mean an edge. On the other hand, an edge in a background area having low smoothness may have low sensitivity to stimulus due to a masking effect. The SCM may be a map for reflecting this property.

The SCM may be the product (multiplication) of pixel values of the corresponding pixels in the SM and the EM. The SURP 300 may set the product of the pixel values of pixels at the corresponding (identical) locations in the SM and the EM to the pixel value of the SCM.

The SURP 300 may generate the SCM using the following Equation (7):

$$SCM(Y)=EM(Y)\times SM(Y)$$

Y may be the pixel at the identical location in the SCM, EM, and SM.

Figure 9:
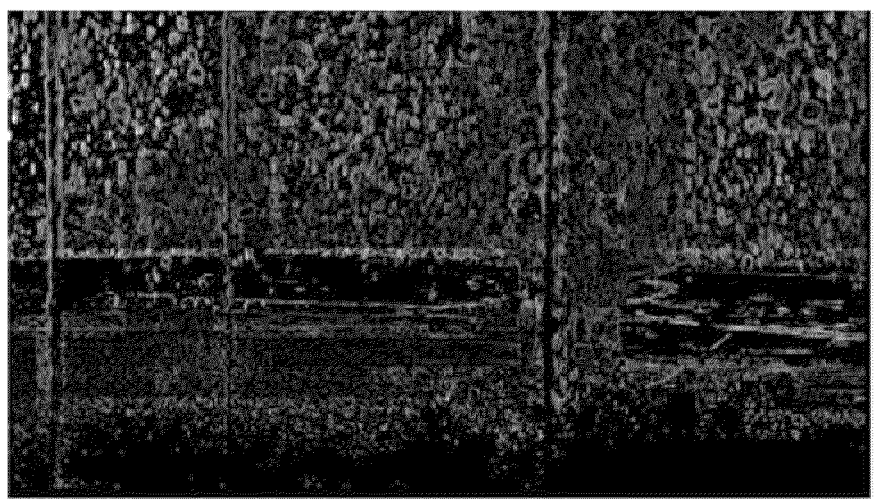
FIG. 9 shows a Spatial Contrast Map (SCM) according to an example.

FIG. 9 illustrates an SCM according to an example.

In FIG. 9, a bright pixel may indicate a background which has a strong edge and has high smoothness. That is, the bright pixel may be either a pixel indicating a strong edge or a pixel indicating a background having high smoothness.

Reference is again to be made to FIG. 5.

At step 530, the SURP 300 may generate a Visual Saliency Map (VSM) for each frame.

Depending on human visual properties, stimulus to an area of interest to a human being may exert greater influence than that of stimulus to an area not of interest to the human being. Information about visual saliency may be used so that these visual properties are reflected in a feature vector.

As an example of a VSM, a graphic-based visual saliency method proposed by Harel and Perona may be used.

Figure 10:
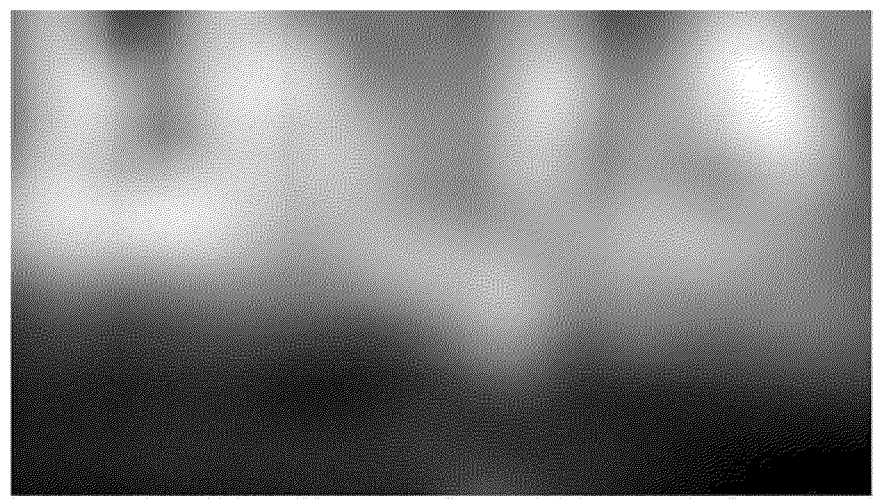
FIG. 10 shows a Visual Saliency Map (VSM) according to an example.

FIG. 10 illustrates a VSM according to an example.

In FIG. 10, a bright area may represent an area of interest to a person when the person views a frame image. That is, the bright area may be an area having high visual saliency. A dark area may represent an area that is not of interest to a person when the person views a frame image. That is, the dark area may be an area having low visual saliency.

Reference is again to be made to FIG. 5.

At step 535, the SURP 300 may generate a Spatial Influence Map (SIM) for each frame.

The SIM may be a map in which information about whether a pixel corresponds to a visual saliency area, as well as neighboring information of an edge corresponding to visual stimulus, is reflected.

The SIM may be the product of the pixel values of the corresponding pixels in the SCM and the VSM. The SURP 300 may set the product of the pixel values of pixels at the corresponding (identical) locations in the SCM and VSM to the pixel value of the SIM.

The SURP 300 may generate the SIM using the following Equation (8):

$$SIM(Y)=SCM(Y)\times VSM(Y) \qquad (8)$$

where Y may be the pixel at the identical location in the SIM, SCM and VSM.

Figure 11:
FIG. 11 shows a Spatial Influence Map (SIM) according to an example.

FIG. 11 illustrates an SIM.

Reference is again to be made to FIG. 5.

The SURP 300 may acquire a feature vector based on the spatial features and temporal features of frames corresponding to basic decision units. At the above-described steps 510, 515, 520, 525, 530, and 535, the procedure for acquiring a feature vector in consideration of the spatial features of frames has been described. At the following steps 540, 545, 550 and 555, a procedure for acquiring a feature vector in consideration of the temporal features of frames will be described.

An area having a high temporal masking effect may be an area containing irregular motion or sudden motion. That is, an area having high randomness may be an area having a high temporal masking effect. The area having a high temporal masking effect may be determined by detecting an area having high randomness from each frame.

By acquiring a feature vector based on temporal features, the SURP 300 allows the visual properties of a human being, who reacts sensitively to irregular motion or sudden motion, to be reflected in the acquisition of a feature vector.

As described above, spatial randomness may be calculated through a model which performs prediction from neighboring pixels. Similar to this calculation scheme, temporal randomness may be calculated through a model which predicts the current frame from previous frames.

In order to calculate temporal randomness, an input period for frames in a GOP may be divided into two intervals.

The intervals may be represented by the following Equation (9):

$$Y_k^l \qquad (9)$$

Y may denote an interval, k may denote a start frame in the interval, and l may denote an end frame in the interval. That is, $Y_k^l$ may indicate that the interval is composed of frames ranging from a k-th frame to an l-th frame.

When Equation (9) is stored as a matrix, columns of the matrix may correspond to respective frames. In other words, storing the interval as the matrix may be performed through the following steps 1) and 2).

1) Frames in the interval may be arranged in the form of a one-dimensional (1D) row vector. For example, a second row in the frame may be concatenated with a first row in the frame. The rows in the frame may be sequentially concatenated with each other.

2) A row vector may be transposed into a column vector. A matrix composed of column vectors of frames may be stored.

When the length of each interval is d, two intervals may be represented by $Y_{k+d}^l$ and $Y_k^{l-d}$, respectively.

At step 540, the SURP 300 may generate a Temporal Prediction Model (TPM).

Figure 12:
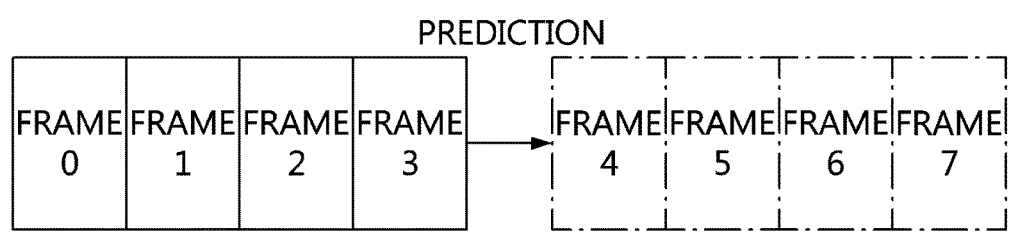
FIG. 12 shows the relationship between frames used to generate a temporal prediction model and prediction target frames according to an example.

In FIG. 12, the case where the size of a GOP is 8 and the value of d is 4 is exemplified.

FIG. 12 illustrates a relationship between frames used to generate a temporal prediction model and prediction target frames according to an example.

In FIG. 12, "frame 0" may denote a first frame and "frame 1" may denote a second frame. That is, "frame n" may be an n+1-th frame.

Referring to FIG. 12, the interval from "frame 0" to "frame 3" may be a first interval, and the interval from "frame 4" to "frame 7" may be a second interval.

The frames in the first interval may be used for a TPM and the frames in the second interval may be predicted by the TPM.

Reference is again to be made to FIG. 5.

The TPM may be generated using the first interval of a GOP. For example, for a GOP having a size of 8, the TPM may be generated using the first frame, the second frame, the third frame, and the fourth frame.

The SURP 300 may perform temporal prediction based on the following Equation (10):

$$Y_{k+d}^l = A Y_k^{l-d} + T \qquad (10)$$

Here, A may be a transformation matrix for providing optimal prediction.

T may be a prediction matrix.

A may be calculated using pseudo-inverse, as given by the following Equation (11).

$$\hat{A} = Y_{k+d}^l (\hat{Y}_k^{l-d})^{-1} \qquad (11)$$

However, since respective matrixes in Equation (11) are very large, it may be substantially impossible to apply Equation (11).

When the expression of a state sequence in the following Equation (12) is used, matrix A may be more easily calculated.

$$Y = CX + W \qquad (12)$$

Here, Y may be a state matrix of X.

C may be an encoding matrix.

W may be a bias matrix.

The following Equation (13) may indicate singular value decomposition of Y. In this case, W may be assumed to be a zero matrix.

$$Y = CDV^T \qquad (13)$$

When Equation (12) is compared with Equation (13), the SURP 300 may derive an optimal state vector using the following Equation (14):

$$\hat{X} = DV^T \qquad (14)$$

The SURP may acquire temporal randomness, which is a temporal prediction error, using the following Equation (15):

$$TR_{k+d}^l = |Y_{k+d}^l - C\hat{A}\hat{X}_k^{l-d}| \qquad (15)$$

Figure 13A:
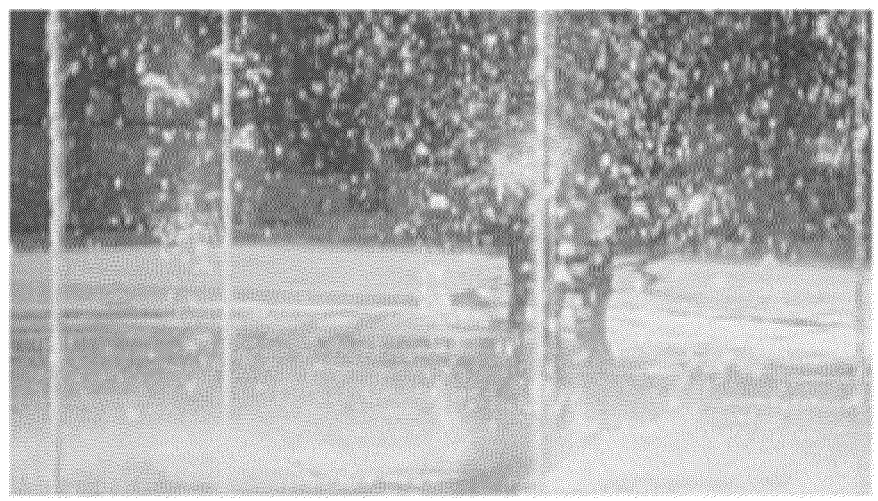
FIG. 13A illustrates a first frame among three consecutive frames according to an example.
Figure 13B:
FIG. 13B illustrates a second frame among the three consecutive frames according to an example.
Figure 13C:
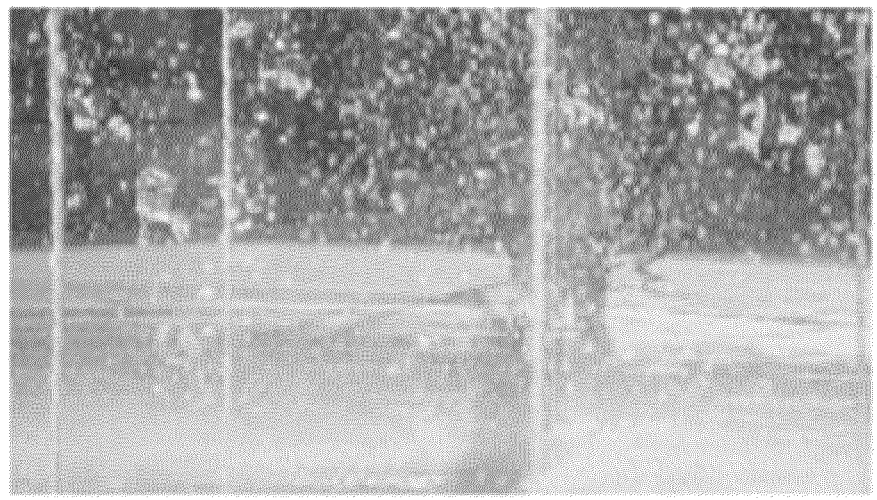
FIG. 13C illustrates a third frame among the three consecutive frames according to an example.

FIGS. 13A to 13C illustrate three consecutive frames according to an example.

FIG. 13A illustrates a first frame among the three consecutive frames according to an example.

FIG. 13B illustrates a second frame among the three consecutive frames according to an example.

FIG. 13C illustrates a third frame among the three consecutive frames according to an example.

Next, maps for the three frames are shown.

Figure 13D:
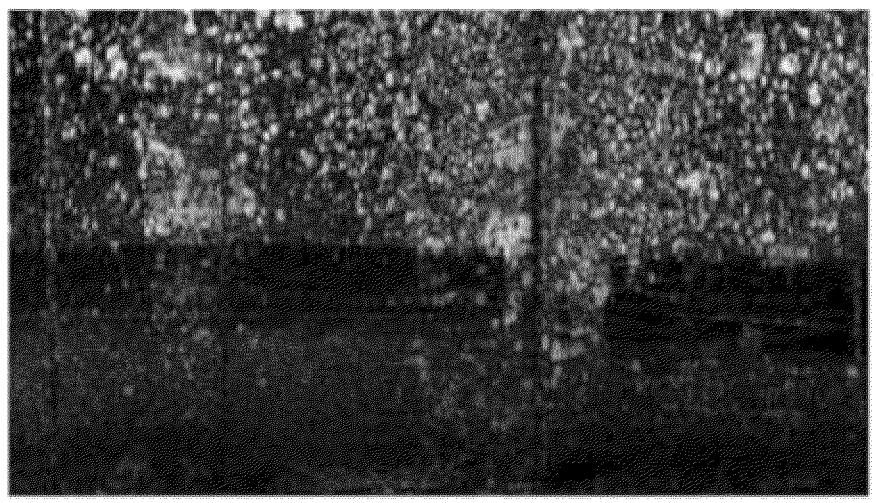
FIG. 13D illustrates a Temporal Randomness Map (TRM) for the three consecutive frames according to an example.

FIG. 13D illustrates a Temporal Randomness Map (TRM) for the three consecutive frames according to an example.

Figure 13E:
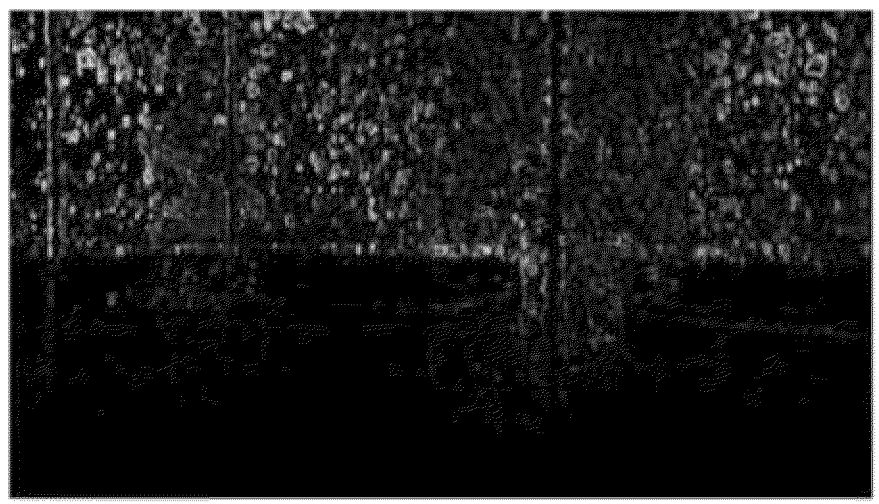
FIG. 13E illustrates a Spatio-temporal Influence Map (STIM) for the three consecutive frames according to an example.

FIG. 13E illustrates a Spatio-Temporal Influence Map (STIM) for the three consecutive frames according to an example.

Figure 13F:
FIG. 13F illustrates a Weighted Spatio-Temporal Influence Map (WSTIM) for the three consecutive frames according to an example.

FIG. 13F illustrates a Weighted Spatio-Temporal Influence Map (WSTIM) for the three consecutive frames according to an example.

The TRM, STIM, and WSTIM will be described in detail later.

Reference is again to be made to FIG. 5.

At step 545, the SURP 300 may generate a Temporal Randomness Map (TRM).

The TRM may be a map for the fourth, fifth, sixth and seventh frames.

In the TRM, a bright pixel may indicate an area having high temporal randomness. The area having high temporal randomness may be an area having a low visual perceptual effect.

At step 550, the SURP 300 may generate a Spatio-Temporal Influence Map (STIM).

The STIM may be a map for the fourth, fifth, sixth, and eighth frames.

When a person views a video, he or she may perceive spatial visual stimulus and temporal visual stimulus together depending on human visual properties. Therefore, both spatial features and temporal features need to be simultaneously reflected in the feature vector.

For reflection of these spatial and temporal features, the STIM may be defined by the following Equation (16):

$$STIM(Y) = SIM(Y) \times TRM(Y) \qquad (16)$$

Y may denote a pixel at a specific location.

The STIM may be the product (multiplication) of pixel values of the corresponding pixels in the SIM and the TRM. The SURP 300 may set the product of the pixel values of pixels at the corresponding (identical) locations in the SIM and the TRM to the pixel value of the STIM.

At step 555, the SURP 300 may generate a Weighted Spatio-Temporal Influence Map (WSTIM).

The WSTIM may be a map for the fourth, fifth, sixth and eighth frames.

The WSTIM may emphasize relatively large stimulus among all stimuli.

The SURP 300 may set a value obtained by dividing the pixel value of the SIM by the average of pixel values of the SIM to the pixel value of the WSTIM.

$$WSTIM(Y) = SIM(Y)/avg(SIM(Y)) \qquad (17)$$

The WSTIM may be effective when stimulus such as fast motion of a small object is present in the frames.

At step 560, the SURP 300 may perform the function of a feature representer. The SURP 300 may output the result of at least one of the TRM, STIM and WSTIM.

The SURP 300 may calculate the averages of blocks of at least one of TRM, STIM and WSTIM for respective blocks having a predefined size in the frame. The SURP 300 may output the averages of the blocks, aligned in descending order. For example, the predefined size may be 64×64.

The above-described maps may be represented in the form of a matrix indicating data such as images. A procedure of the feature representer, which represents the above-described maps in the form of vectors suitable for feature vectors, is required.

The SURP 300 may divide each map into units of blocks having a predefined size. For example, when a video is a high-definition (HD) video, the size of the blocks may be 64×64. For each block, the SURP 300 may calculate the average of pixels in the corresponding block. Further, the SURP 300 may align the blocks of the map in sequence from a block having a large pixel average value to a block having a small pixel average value so as not to be location-dependent.

Through this procedure, each map may be represented by a one-dimensional (1D) array such as a histogram.

When the video is an HD video, the size of a 1D array may be 507.

The 1D array may be an array in which blocks are aligned in the sequence of the average values thereof. Therefore, generally, larger values may be arranged near the beginning of the 1D array and smaller values may be arranged in the direction to the end of the 1D array. Therefore, even if only a part of the values near the beginning of the 1D array are used as a feature vector, the difference in performance may not be great compared to the case where all values in the 1D array are used. Based on these features, the SURP 300 may use only a part of the larger values near the beginning of the 1D array as the feature vector, rather than using all of the values in the 1D array as the feature vector. Here, the part may be a predefined length or a predefined rate. In the 1D array, large values may be arranged near the beginning of the array. For example, the SURP 300 may use the first 100 values among the values in the 1D array.

Learning of Model

The SURP 300 may use an SVM. The machine learning of the SURP 300 may include the following tasks 1) to 3).

1) The SURP 300 may extract a feature vector from a GOP.

2) The SURP 300 may predict an output by using the extracted feature vector as the input of the SVM.

3) The SURP 300 may generate the SVM so that the value, output through output prediction, has a value closest to ground truth.

Below, an example in which a model is learned to predict the degradation of image quality when a 60 FPS video is converted into to a 30 FPS video will be described.

First, ground truth has already been acquired through subjective quality assessment for data sets of a homogeneous video.

Next, the SURP 300 may obtain a TRM, an STIM, and a WSTIM for the 60 FPS video. Further, the SURP 300 may obtain a TRM, an STIM, and a WSTIM by internally assuming that the FPS of a video is 30. Then, the SURP 300 may convert the TRM, STIM and WSTIM of the 60 FPS video into 1D arrays through the feature representer, and may convert the TRM, STIM and WSTIM of the 30 FPS video into 1D arrays through the feature representer.

Next, the SURP 300 may train the SVM so that feature vector of the 60 FPS video and the feature vector of the 30 FPS video have a difference therebetween corresponding to the ground truth.

Thereafter, when learning has been completed, the SURP 300 may individually extract the feature vector of a 60 FPS GOP and the feature vector of a 30 FPS GOP using the 60 FPS GOP, without internally changing the SVM.

The SURP 300 may predict the extent of the difference between the image quality of the 60 FPS GOP and the image quality of the 30 FPS GOP using both the feature vector of the 60 FPS GOP and the feature vector of the 30 FPS GOP, and may ultimately generate and output a satisfied user ratio based on the predicted extent of the image quality difference.

Here, 60 FPS and 30 FPS are merely given as examples. The SURP 300 may generate and output a satisfied user ratio for conversion between videos having other frame rates in a way similar to that of the generation of the satisfied user ratio for the conversion between the 60 FPS and 30 FPS videos. For example, the frame rate (FPS) may be changed from 60 to 15. Alternatively, the frame rate (FPS) may be changed from 120 to 60.

In order to generate the feature vector of the SVM, only one of the above-described maps, that is, SIM, TRM, STIM and WSTIM may be used, or, alternatively, two or more maps thereof may be simultaneously used.

Further, multiple SVMs may be combined in a cascading manner. For example, an SVM which uses a TRM as a feature vector may be applied, and an SVM which uses an STIM and the result of a previous SVM as a feature vector may be applied. Furthermore, an SVM which uses a WSTIM and the result of a previous SVM as a feature vector may be applied.

Determination of Optimal Frame Rate

Hereinafter, a method for determining an optimal frame rate for each basic decision unit using the SURP 300 and performing optimal encoding on a video using the determined optimal frame rate will be described.

For the basic decision unit of a video, the SURP 300 may predict the minimum FPS of the basic decision unit, which fulfills the condition of a given minimum satisfied user ratio or a predefined satisfied user ratio, and may provide a basic decision unit converted to the minimum satisfied user ratio.

The SURP 300 may encode the basic decision unit converted to the minimum satisfied user ratio.

FIG. 14 illustrates satisfied user ratios for respective FPSs according to an example.

As described above, the SURP 300 may predict the satisfied user ratio of a GOP converted to a specific FPS, and may output the predicted satisfied user ratio. When the above-described function is applied, the SURP 300 may predict and output multiple satisfied user ratios for respective GOPs of the video.

As the multiple satisfied user ratios for multiple FPSs of GOPs are predicted, the multiple predicted satisfied user ratios may be used for encoding.

In FIG. 14, a first row in a horizontal direction indicates multiple GOPs of a video. A first column in a vertical direction indicates changed FPSs of each GOP. For respective GOPs, satisfied user ratios (%) at the changed FPSs are illustrated.

In FIG. 14, a source video may have 60 FPS.

The SURP 300 may sequentially perform machine learning on multiple FPSs of a target video. First, when the video is converted to 30 FPS, the SURP 300 may perform machine learning. Further, when the video is converted to 15 FPS, the SURP 300 may perform machine learning. Furthermore, when the video is converted to 7.5 FPS, the SURP 300 may perform machine learning. In other words, the SURP 300 may perform machine learning on individual FPSs of the target video.

In the state in which machine learning has been performed, the SURP 300 may sequentially predict the satisfied user ratios of each GOP of the video for respective multiple FPSs. For example, when the FPS of the target video is 30, the satisfied user ratios of three GOPs of the target video may be 80%, 90%, and 50%, respectively. When the FPS of the target video is 15, the satisfied user ratios of three GOPs may be 70%, 60%, and 45%, respectively.

By means of this prediction, the SURP 300 may calculate the satisfied user ratios of the GOPs for multiple FPSs.

Further, the SURP 300 may consider the satisfied user ratio of the GOP of a source video to be 100%.

In FIG. 14, the last row may indicate a requirement. The requirement may denote a required image (picture) quality or a minimum satisfied user ratio. That is, the last row may mean that the satisfied user ratio should be 75% or more.

Figure 15:
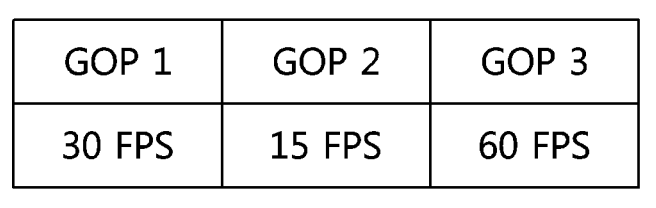

FIG. 15 illustrates optimal frame rates determined for respective GOPs according to an example.

The SURP 300 may determine an optimal FPS that fulfills a requirement for each GOP. Here, the optimal FPS may be an FPS which is equal to or greater than that of the requirement while being the FPS of the GOP having the lowest satisfied user ratio. In other words, the optimal FPS may be the lowest FPS that fulfils the requirement. If there is no FPS that fulfils the satisfied user ratio that is equal to or greater than that of the requirement, among the FPSs of the target videos generated via conversion, the optimal FPS may be the FPS of the source video.

In FIG. 15, optimal frame rates determined for respective multiple GOPs are illustrated.

For example, referring to FIG. 14, the satisfied user ratios of the first GOP at multiple FPSs may be 80%, 70%, and 50%, respectively. Among the satisfied user ratios, the satisfied user ratio that is equal to or greater than that of the requirement while being the lowest satisfied user ratio may be 80 at 30 FPS. Therefore, the optimal frame rate of the first GOP may be 30 FPS. The satisfied user ratios of the second GOP at multiple FPSs may be 90%, 80%, and 50%, respectively. Among the satisfied user ratios, the satisfied user ratio that is equal to or greater than that of the requirement while being the lowest satisfied user ratio may be 80 at 15 FPS. Therefore, the optimal frame rate of the second GOP may be 15 FPS. The satisfied user ratios of the third GOP at multiple FPSs may be 50%, 45%, and 40%, respectively. Since there is no satisfied user ratio that is equal to or greater than that of the requirement, among the satisfied user ratios, the third GOP cannot be converted. Therefore, the optimal frame rate of the third GOP may be 60 FPS, which is the frame rate of the source video.

The frame rate of each of the multiple GOPs may be converted into the optimal frame rate thereof, and converted GOPs of the video may be encoded.

Figure 16:
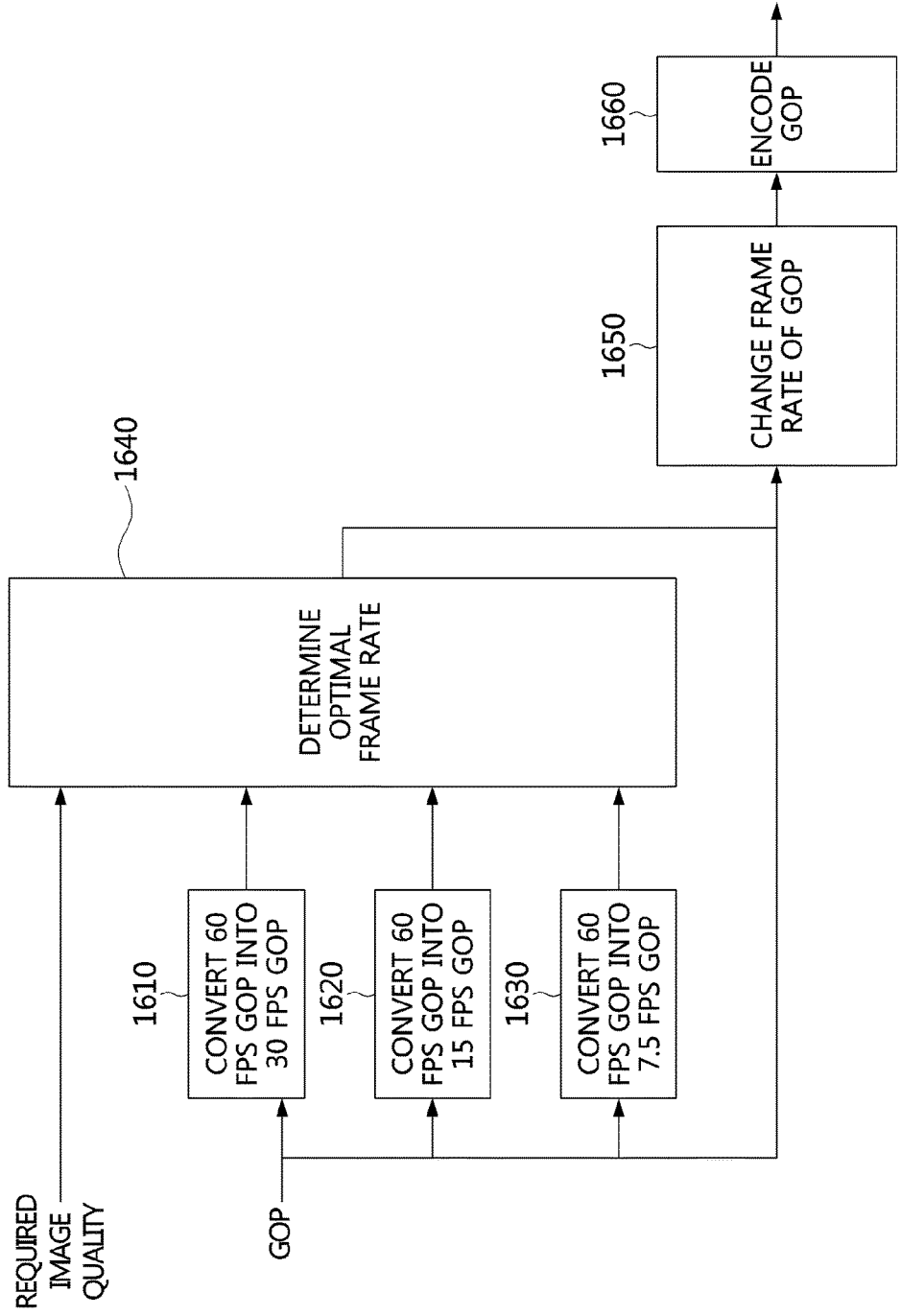
FIG. 16 is a flowchart showing a method for encoding a GOP using an optimal frame rate according to an embodiment.

FIG. 16 is a flowchart showing a method for encoding a GOP using an optimal frame rate according to an embodiment.

First, an input video is shown as having a frame rate of 60 FPS. The GOPs of the input video may be sequentially processed at steps 1610, 1620, 1630, 1640, 1650, and 1660.

At step 1610, the SURP 300 may convert a 60 FPS GOP into a 30 FPS GOP and may calculate the satisfied user ratio of the 30 FPS GOP.

At step 1620, the SURP 300 may convert the 60 FPS GOP into a 15 FPS GOP and may calculate the satisfied user ratio of the 15 FPS GOP.

At step 1630, the SURP 300 may convert the 60 FPS GOP into a 7.5 FPS GOP and may calculate the satisfied user ratio of the 7.5 FPS GOP.

At step 1640, the SURP 300 may determine an optimal frame rate.

The SURP 300 may receive a required image (picture) quality. The required image quality may indicate the above-described minimum satisfied user ratio.

The SURP 300 may select an optimal GOP, which fulfills the minimum satisfied user ratio, from among the GOPs converted into GOPs having predefined FPSs. Here, the optimal GOP may be the GOP having the lowest FPS.

Alternatively, the SURP 300 may determine an optimal frame rate, which fulfills the minimum satisfied user ratio, among the FPSs of the converted GOPs. The SURP 300 may select the GOP having a satisfied user ratio, which is the lowest while being equal to or greater than the minimum satisfied user ratio, from among the satisfied user ratios of the converted GOPs, or may select the FPS of the GOP. The optimal frame rate may be either the selected FPS or the FPS of the selected GOP.

At step 1650, the SURP 300 may select the FPS of the GOP having the optimal frame rate. The SURP 300 may change the FPS of the GOP to the optimal frame rate. Alternatively, the SURP 300 may select the GOP having the optimal frame rate from among the GOP of the input video and the GOPs converted at steps 1610, 1620, and 1630.

At step 1660, the SURP 300 may encode the GOP selected at step 1650.

Figure 17:
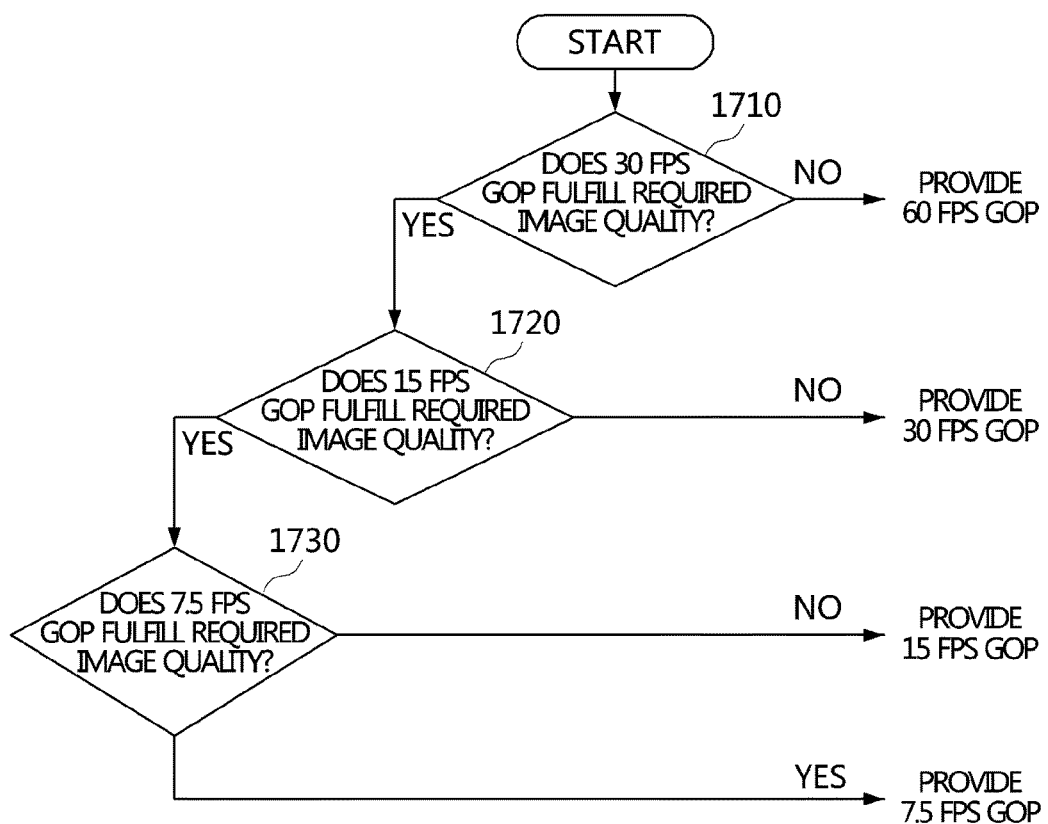
FIG. 17 is a flowchart showing a method for determining an optimal frame rate according to an embodiment.

FIG. 17 is a flowchart showing a method for determining an optimal frame rate according to an embodiment.

Step 1640, described above with reference to FIG. 16, may include the following steps 1710, 1720, and 1730.

The SURP 300 may sequentially check whether the converted GOPs fulfill the required image quality in sequence from a high FPS GOP to a low FPS GOP. The SURP 300 may select the GOP previous to the GOP that does not fulfill the required image quality.

When the first GOP of the converted GOPs does not fulfill the required image quality, the GOP of the source video may be selected. In other words, when there is no GOP that fulfills the required image quality among the converted GOPs, the GOP of the source video may be selected.

When the last GOP of the converted GOPs does not fulfill the required image quality, the last GOP may be selected. In other words, when all of the converted GOPs fulfill the required image quality, the GOP having the lowest FPS may be selected.

At step 1710, the SURP 300 may check whether the 30 FPS GOP fulfils the required image quality. If the 30 FPS GOP does not fulfill the required image quality, the SURP 300 may select 60 FPS as the optimal frame rate, and may provide the 60 FPS GOP. When the 30 FPS GOP fulfills the required image quality, step 1720 may be performed.

At step 1720, the SURP 300 may check whether the 15 FPS GOP fulfills the required image quality. If the 15 FPS GOP does not fulfill the required image quality, the SURP 300 may select 30 FPS as the optimal frame rate and may provide the 30 FPS GOP. If the 15 FPS GOP fulfills the required image quality, step 1730 may be performed.

At step 1730, the SURP 300 may check whether the 7.5 FPS GOP fulfills the required image quality. If the 7.5 FPS GOP does not fulfill the required image quality, the SURP 300 may select 15 FPS as the optimal frame rate and may provide the 15 FPS GOP. If the 7.5 FPS GOP fulfills the required image quality, the SURP 300 may select 7.5 FPS as the optimal frame rate and may provide the 7.5 FPS GOP.

Figure 18:
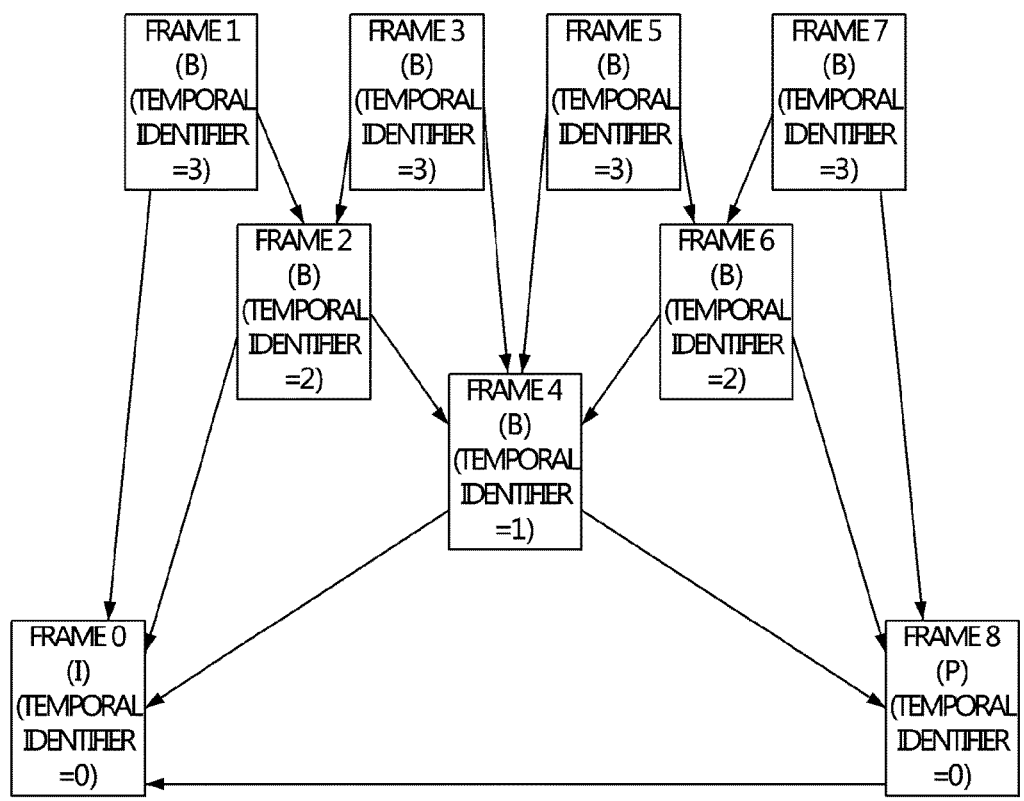
FIG. 18 illustrates the hierarchical structure of frames having temporal identifiers according to an example.

FIG. 18 illustrates the hierarchical structure of frames having temporal identifiers according to an example.

In FIG. 18, 9 frames are illustrated. The 9 frames may be "frame 0" to "frame 8".

Each frame may have a Temporal Identifier (TI). Further, each frame may be an I frame, a P frame or a B frame.

As described above, when a GOP is converted into GOPs corresponding to multiple FPSs by the SURP 300, the satisfied user ratios of the multiple converted GOPs may be predicted. When a bitstream generated via video encoding includes satisfied user ratio information related to a satisfied user ratio, an improved bitstream, which supports selective Temporal Scalability (TS) while maintaining the satisfied user ratio, may be provided.

In a High-Efficiency Video Coding (HEVC) standard, the TI of each frame may be transmitted through a Network Abstraction Layer (NAL) header. For example, the TI information of the NAL header "nuh_temporal_id_plus1" may indicate the TI of the frame.

Using the TI information of the NAL header, TS for providing satisfied user ratio information may be provided.

When the size of a GOP is 8 and the hierarchical structure of FIG. 18 is used, if odd-numbered frames having a TI of 3 are removed from the GOP, the FPS of the GOP may be reduced to half. That is, the FPS of the GOP may be changed from 60 to 30.

In addition, when "frame 2" and "frame 6", each having a TI of 2, are removed from the GOP, the FPS of the GOP may be reduced to ¼. That is, the FPS of the GOP may be changed from 60 to 15.

When TS is provided, the video may have a fixed FPS when only TI is used. For example, when a 60 FPS video is displayed, a fixed 30 FPS may be applied to the entire video when frames having a TI of 3 are excluded from display. In this way, when temporal scalability (TS) that considers only TI is used, if an object having fast motion is present in a middle portion of the video, serious quality degradation may occur for the fast moving object to such an extent that a viewer is capable of perceiving such quality degradation.

Improved Temporal Scalability

Hereinafter, an encoding and decoding method for providing improved temporal scalability using satisfied user ratio information generated by the SURP 300 will be described.

When the above-described SURP 300 is used, TS may be applied to each GOP. In other words, when the above-described SURP 300 is used, the satisfied user ratios of GOPs may be predicted for respective multiple FPSs. When the satisfied user ratios of the GOPs are used, TS may be provided while image quality is maintained.

The SURP 300 may determine, for respective TIs, pieces of satisfied user ratio information corresponding to respective TIs. The satisfied user ratio information may indicate respective satisfied user ratios. Here, satisfied user ratio information corresponding to a specific TI may indicate a satisfied user ratio for image quality when frames having TIs above the specific TI are excluded from encoding, decoding or display.

For example, "frame x" may be included in or excluded from display depending on the FPS at which the GOP is displayed. Depending on the FPS, "frame x" may be excluded from decoding or display due to TS. In this case, if the maximum FPS, among the FPSs at which "frame x" is excluded from display, is y, the satisfied user ratio at a FPS of y is z, and the TI of the "frame x" is w, the satisfied user ratio corresponding to the TI w may be z.

Further, in a GOP, frames having the same TI may have the same satisfied user ratio information in common. Therefore, depending on the required satisfied user ratio, a decoding apparatus 2700 (see FIG. 27), which will be described later, may adaptively select whether to display frames having a specific TI.

For example, a required satisfied user ratio of Z may indicate that frames having TIs for which corresponding satisfied user ratios are less than or equal to Z must be included in display. Further, this determination may indicate that, when the required satisfied user ratio is Z, frames having TIs that correspond to satisfied user ratios greater than Z may be excluded from display.

The satisfied user ratio corresponding to a TI may be contained in the Supplemental Enhancement Information (SEI) message of the access unit of a frame, and may be included in the header of a NAL unit. Here, the SEI message or the NAL unit header may directly contain the value of the satisfied user ratio information. Alternatively, the SEI message or the NAL unit header may contain the value of the index of a satisfied user ratio table.

In a GOP, frames having the same TI may have the same satisfied user ratio information. Therefore, in the GOP, for each TI, the satisfied user ratio information may be transmitted from an encoding apparatus 2400 (see FIG. 24) to the decoding apparatus 2700 (see FIG. 27) through SEI only in the first frame of each TI. Alternatively, in the first frame of the GOP, satisfied user ratio information about all TIs may be simultaneously transmitted.

Figure 19:
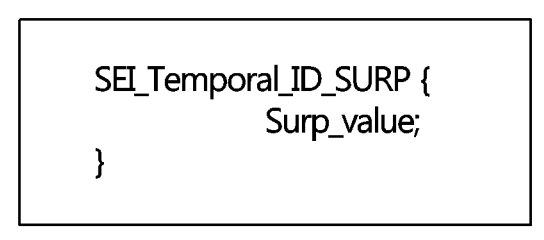

FIG. 19 illustrates a message containing a satisfied user ratio according to an example.

In FIG. 19, a Supplemental Enhancement Information (SEI) message in the access unit of the frame may contain satisfied user ratio information. In other words, the satisfied user ratio information may be provided via the SEI message in the access unit of the frame.

In FIG. 19, "SEI_Temporal_ID_SURP" may denote data used to provide satisfied user ratio information. "Surp_value" may denote satisfied user ratio information.

For example, "Surp_value" having a value of 70 may indicate that a satisfied user ratio is "70%".

Figure 20:
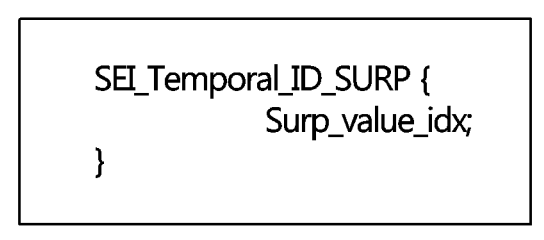

FIG. 20 illustrates a message containing the index of a satisfied user ratio table according to an example.

In FIG. 20, a Supplemental Enhancement Information (SEI) message in the access unit of the frame may contain satisfied user ratio information. In other words, the satisfied user ratio information may be provided via the SEI message in the access unit of the frame.

In FIG. 20, "SEI_Temporal_ID_SURP" may denote data used to provide satisfied user ratio information. "Surp_value_idx" may denote the index of a satisfied user ratio table.

The values of the satisfied user ratio used in a video or a GOP may be predefined in the satisfied user ratio table. For example, the satisfied user ratio table may contain the values {90, 60, 30}. These values may indicate that satisfied user ratios of 90, 60, and 30 are used. The case where the value of "Surp_value_idx" is 0 may mean that the value of index 0 in the satisfied user ratio table, that is, 90 or 90%, is the value of the satisfied user ratio. The case where the value of "Surp_value_idx" is 1 may mean that the value of index 1 in the satisfied user ratio table, that is, 60 or 60%, is the value of the satisfied user ratio.

FIG. 21 illustrates a message containing all satisfied user ratios according to an example.

In FIG. 21, a single SEI message may contain the satisfied user ratio information of TIs of all frames in a GOP.

In FIG. 21, "Max_Temporal_ID" may denote the maximum number of TIs. "Temporal ID[i]" may denote the index of a TI having a value of i or i−1. Alternatively, "Temporal ID[i]" may denote the satisfied user ratio information of the i-th TI.

The satisfied user ratio information may indicate the actual value of a satisfied user ratio or the index of a satisfied user ratio table. In FIG. 21, "Temporal ID[i]" is illustrated as indicating the index of the satisfied user ratio table.

Figure 22:
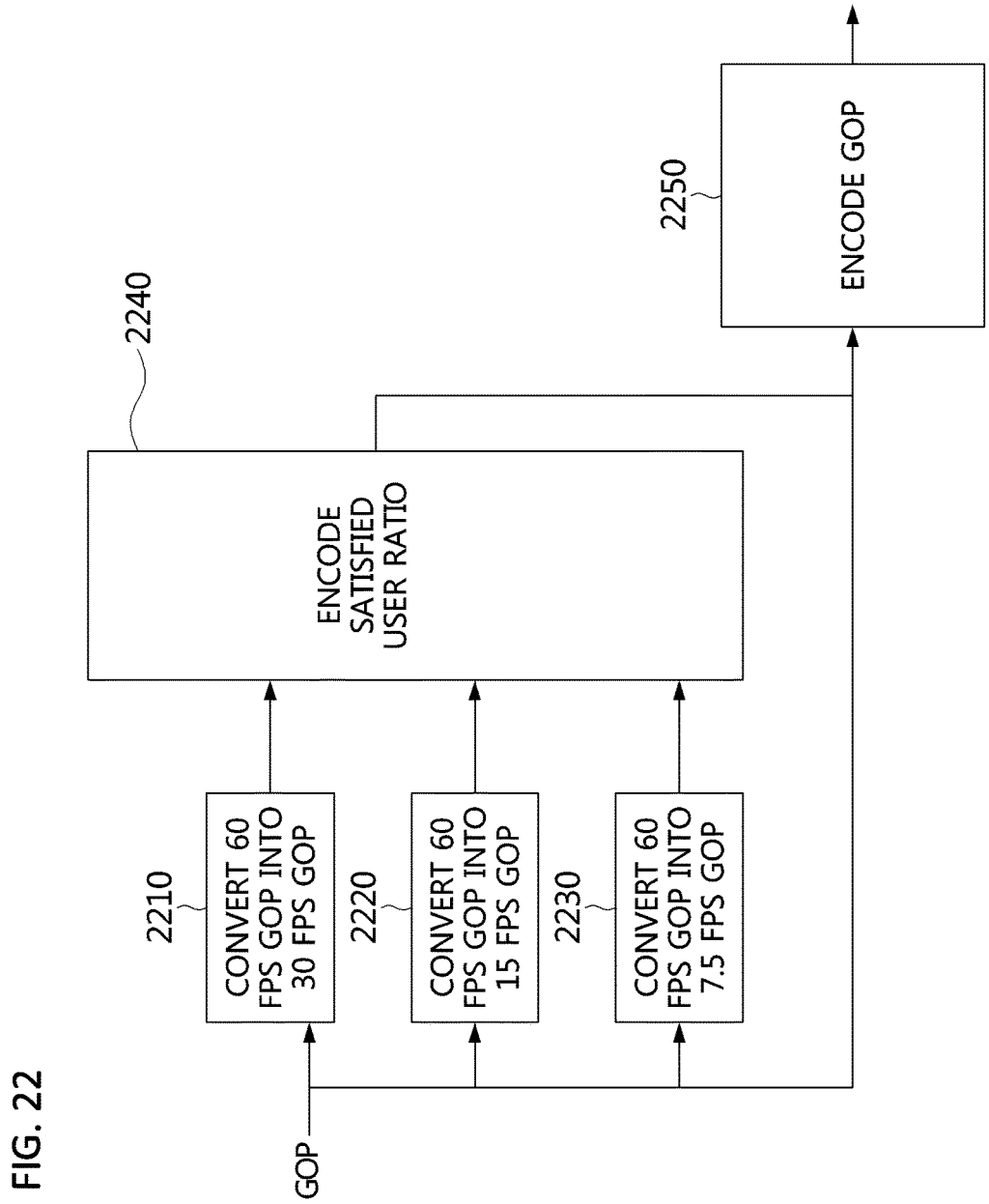
FIG. 22 illustrates a method for generating satisfied user ratio information according to an embodiment.

FIG. 22 illustrates a method for generating satisfied user ratio information according to an embodiment.

FIG. 22 is a flowchart showing a method for encoding a GOP including satisfied user ratio information according to an embodiment.

First, an input video is illustrated as having 60 FPS. The GOPs of the input video may be sequentially processed at steps 2210, 2220, 2230, 2240 and 2250.

At step 2210, the SURP 300 may convert a 60 FPS GOP into a 30 FPS GOP and may calculate the satisfied user ratio of the 30 FPS GOP.

At step 2220, the SURP 300 may convert the 60 FPS GOP into a 15 FPS GOP and may calculate the satisfied user ratio of the 15 FPS GOP.

At step 2230, the SURP 300 may convert the 60 FPS GOP into a 7.5 FPS GOP and may calculate the satisfied user ratio of the 7.5 FPS GOP.

At step 2240, the SURP 300 may encode the satisfied user ratio information of the frames in respective GOPs.

At step 2250, the SURP 300 may encode the GOPs. The SURP 300 may encode the multiple frames in respective GOPs.

In the embodiment, all frames in the GOPs may be encoded. Which of the frames are to be displayed may be determined at the encoding step based on the minimum satisfied user ratio.

Figure 23A:
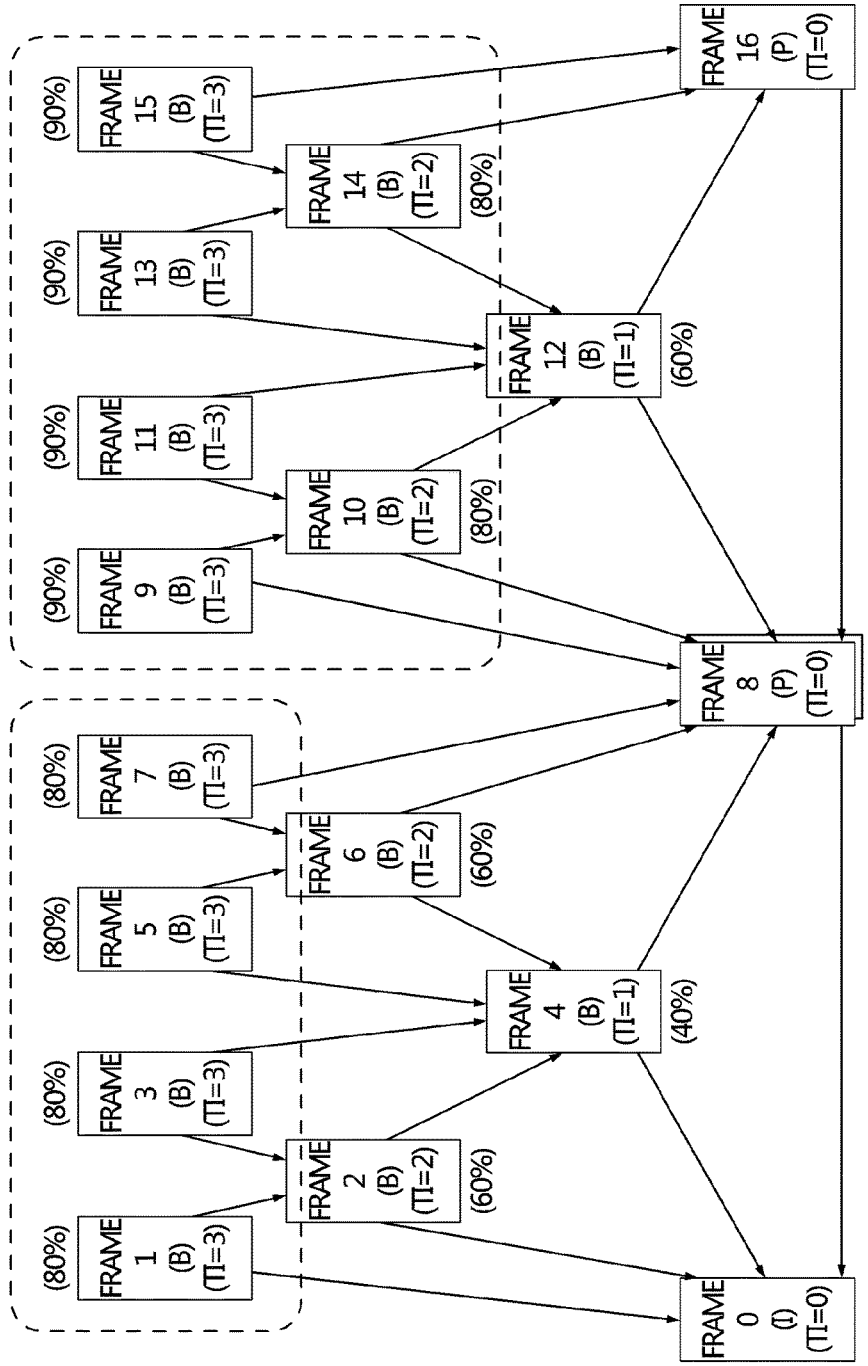
FIG. 23A illustrates a configuration for maintaining a satisfied user ratio of 75% or more according to an example.

FIG. 23A illustrates a configuration for maintaining a satisfied user ratio at 75% or more according to an example.

In FIG. 23A, each rectangle indicates a frame. In FIG. 23A, a first GOP includes "frame 0" to "frame 7". A second GOP includes "frame 8" to "frame 15". "TI" in each rectangle indicates the value of a temporal identifier of the frame. "I", "P" or "B" in each rectangle indicates the type of frame. The number depicted above or below each rectangle indicates the satisfied user ratio of the corresponding frame.

The SURP 300 may convert each of GOPs in the video to a minimum FPS required to fulfill the minimum satisfied user ratio and may encode each converted GOP. In this case, the encoded video may be transmitted at the minimum bit rate required to fulfill the minimum satisfied user ratio. This scheme may be profitable from the standpoint of transmission.

In FIG. 23A, the case where TS is applied such that a satisfied user ratio of at least 75% is assured has been exemplified.

In FIG. 23A, frames enclosed by the dotted line may indicate frames that are neither encoded nor transmitted. In FIG. 23A, in the first GOP, frames may be transmitted at 30 FPS so that a minimum satisfied user ratio of 75% is fulfilled. Further, in the second GOP, frames may be transmitted at 15 FPS so that a minimum satisfied user ratio of 75% is fulfilled.

The SURP 300 may include the satisfied user ratio information of TIs in a bitstream. The decoding apparatus 2700 (see FIG. 27) may determine the minimum FPS required to fulfill the minimum satisfied user ratio with reference to the satisfied user ratio information, and may receive frames required for the determined FPS from the encoding apparatus. The decoding apparatus may display the received frames.

The decoding apparatus 2700 may determine the minimum FPS required to fulfill the minimum satisfied user ratio for each GOP with reference to the satisfied user ratio information. The decoding apparatus 2700 may decode frames required for the determined FPS. Here, the frames may be the frames in each GOP. The frames required for the determined FPS may be received from the encoding apparatus. The decoding apparatus may display the received frames.

Figure 24:
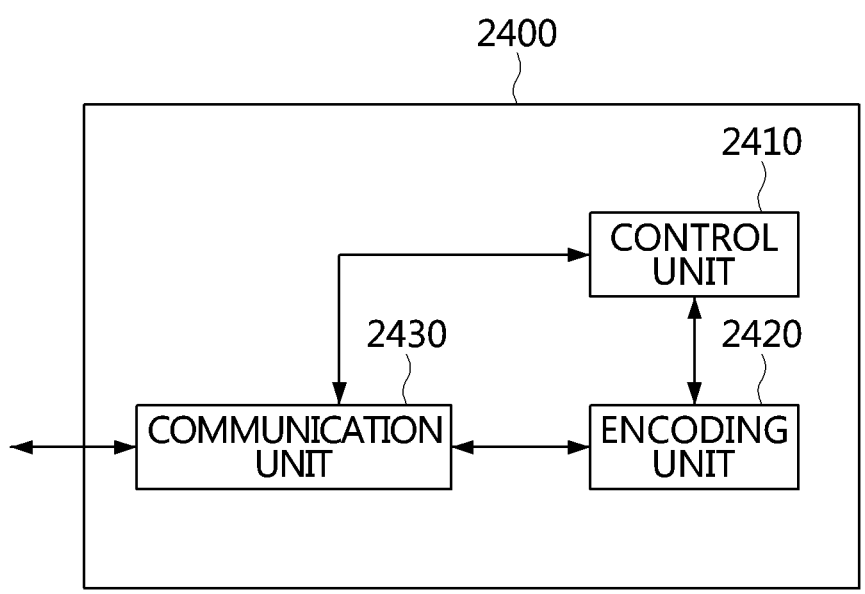
FIG. 24 is a configuration diagram of an encoding apparatus according to an embodiment.

The decoding apparatus 2700 may selectively acquire only frames determined to be decoded through TS from the frames in the video or each GOP from the encoding apparatus 2400 (see FIG. 24).

The decoding apparatus 2700 may selectively decode frames having a satisfied user ratio that is less than or equal to the minimum satisfied user ratio, among the frames in the GOP. The decoding apparatus 2700 may efficiently transmit and display the video without degrading the image quality perceived by viewers by excluding frames having a satisfied user ratio that is greater than the minimum satisfied user ratio from decoding.

Figure 23B:
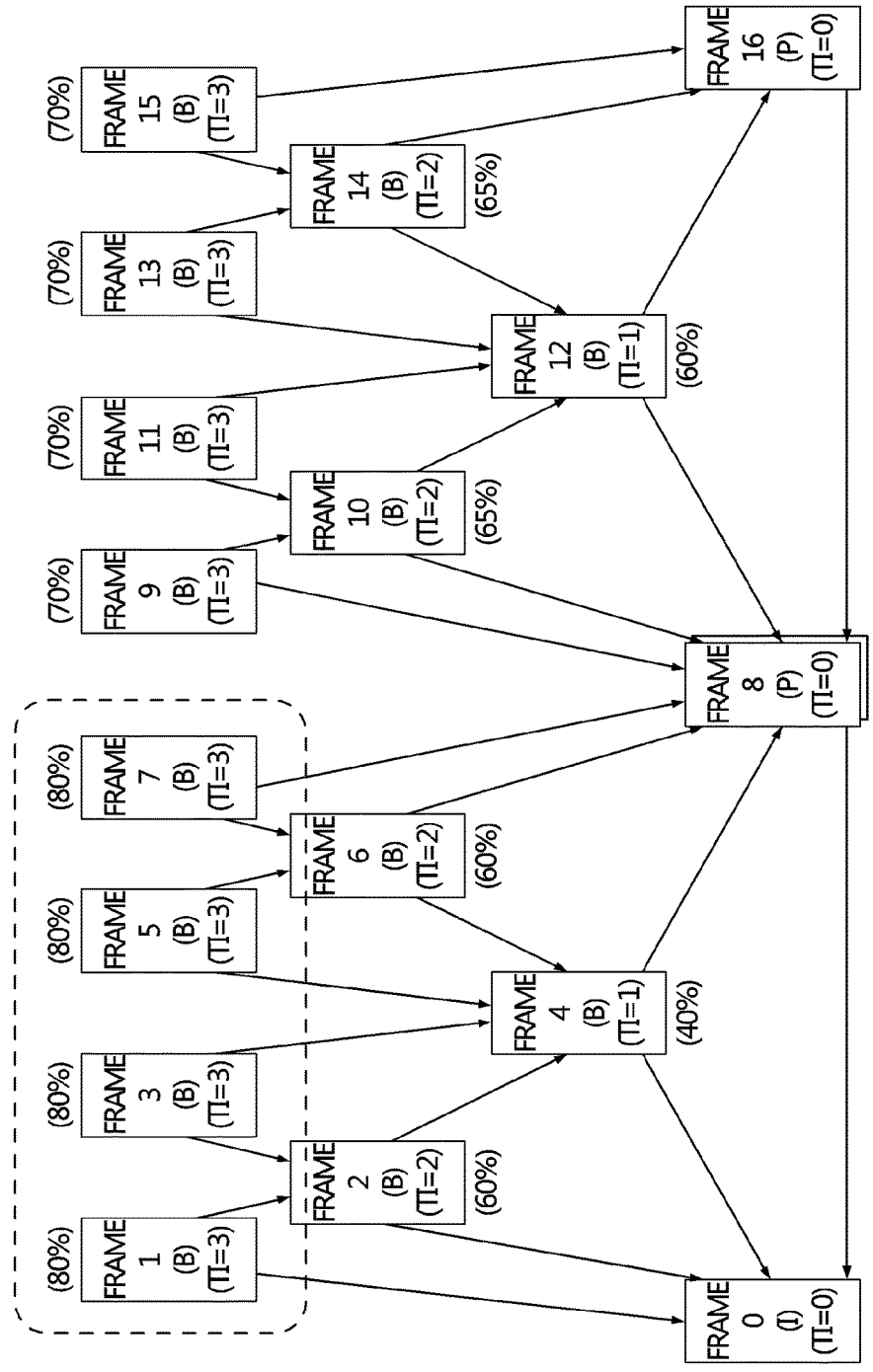
FIG. 23B illustrates a configuration for determining whether to change an FPS based on the satisfied user ratio of 75% according to an example.

FIG. 23B illustrates a configuration for determining whether to change an FPS based on a satisfied user ratio of 75% according to an example.

In FIG. 23B, each rectangle indicates a frame. In FIG. 23B, a first GOP includes "frame 0" to "frame 7". A second GOP includes "frame 8" to "frame 15". "TI" in each rectangle indicates the value of a temporal identifier of the frame. "I", "P" or "B" in each rectangle indicates the type of frame. The number depicted above or below each rectangle indicates the satisfied user ratio of the corresponding frame.

The SURP 300 basically changes the FPS of the GOP to 30, but when the satisfied user ratio is less than 75%, the SURP 300 may maintain the FPS of the source video without changing the FPS of the GOP. In other words, the SURP 300 may adaptively use TS based on the minimum satisfied user ratio. This function may be particularly necessary in an environment in which image quality is considered to be important.

In FIG. 23B, the first GOP may be encoded and transmitted, with the frame rate of the first GOP being converted to 30 FPS, and the second GOP may be encoded and transmitted, with the frame rate of the second GOP being maintained at 60 FPS.

FIG. 24 is a configuration diagram of an encoding apparatus according to an embodiment.

An encoding apparatus 2400 may include a control unit 2410, an encoding unit 2420, and a communication unit 2430.

The control unit 2410 may correspond to the above-described SURP 300. For example, the function of the above-described SURP 300 may be performed by the control unit 2410. Alternatively, the control unit 2410 may perform the function of the SURP 300.

The control unit 2410 may generate selection information for at least one frame of a video.

The selection information may correspond to the above-described satisfied user ratio information. Alternatively, the selection information may include the satisfied user ratio information.

The selection information may be related to the proportion of persons who are unable to perceive the degradation of video quality even if the frame is excluded from the encoding of the video.

Alternatively, the selection information may be related to the proportion of persons who are unable to perceive the degradation of the quality of a displayed video even if the display of the video is set such that the frame is excluded from decoding.

The selection information may include multiple pieces of selection information. The multiple pieces of selection information may be calculated for each FPS for the display of a video or a basic decision unit. The control unit 2410 may calculate pieces of selection information for multiple FPS s.

The proportion of the persons who are unable to perceive the degradation of video quality may be calculated via machine learning of the control unit 2410. As described above, the proportion of persons who are unable to perceive the degradation of video quality may be determined based on the feature vector of either the frame or a basic decision unit including the frame.

The selection information may be applied in common to other frames having the same TI as that of the frame, among multiple frames including the frame. The multiple frames may be the frames in a basic decision unit. Alternatively, the multiple frames may be the frames in a GOP.

The control unit 2410 may encode the video based on the generated selection information.

For example, the control unit 2410 may encode the selection information and may include the encoded selection information in the bitstream of the encoded video.

For example, the control unit 2410 may select the frame to be encoded from among the frames of the video based on the selection information.

The encoding unit 2420 may correspond to the above-described encoding apparatus 100. For example, the function of the above-described encoding apparatus 100 may be performed by the encoding unit 2420. Alternatively, the encoding unit 2420 may include the encoding apparatus 100.

The encoding unit 2420 may encode the selected frame of the video.

In an example, the encoding unit 2420 may encode all frames of the video.

In another example, the encoding unit 2420 may encode frames selected by the control unit 2410.

Figure 27:
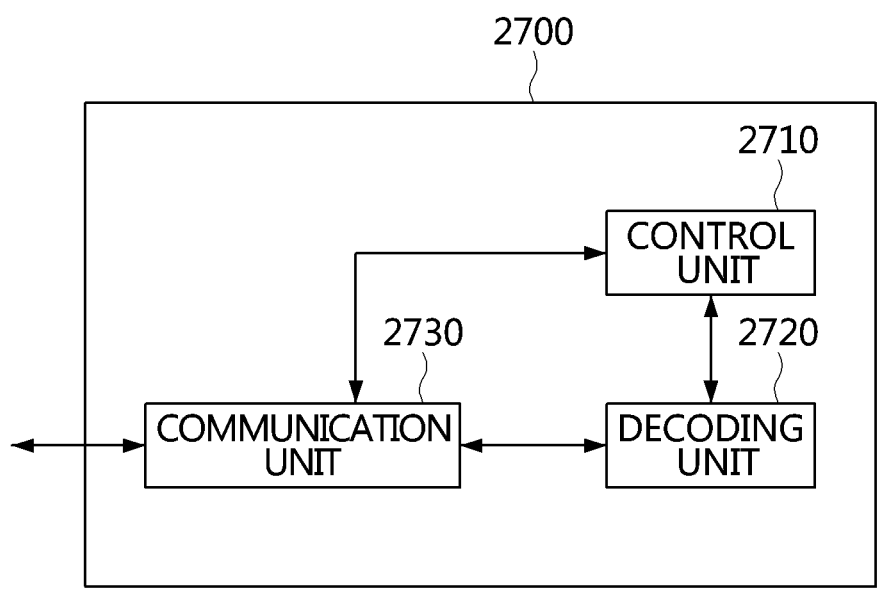
FIG. 27 is a configuration diagram of a decoding apparatus according to an embodiment.

The communication unit 2430 may transmit the generated bitstream to a decoding apparatus 2700 (see FIG. 27).

The bitstream may include information about the encoded video, and may also include the encoded selection information.

The functions and operations of the control unit 2410, the encoding unit 2420, and the communication unit 2430 will be described in detail below.

Figure 25:
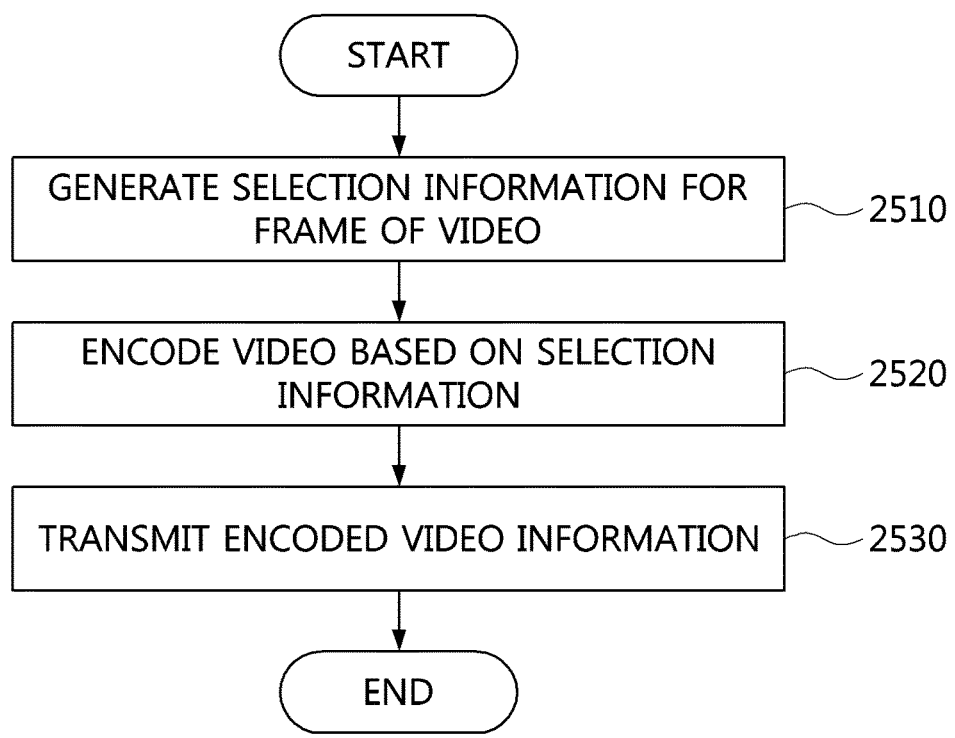
FIG. 25 is a flowchart showing an encoding method according to an embodiment.

FIG. 25 is a flowchart showing an encoding method according to an embodiment.

At step 2510, the control unit 2410 may generate selection information for at least one frame of a video.

At step 2520, the control unit 2410 may encode the video based on the selection information.

The encoding unit 2420 may encode the frame of the video. The encoding unit 2420 may generate a bitstream by encoding the frame of the video. The bitstream generated by encoding the video may include the selection information.

At step 2530, the communication unit 2430 may transmit the bitstream including information about the encoded video to a decoding apparatus 2700 (see FIG. 27).

Figure 26:
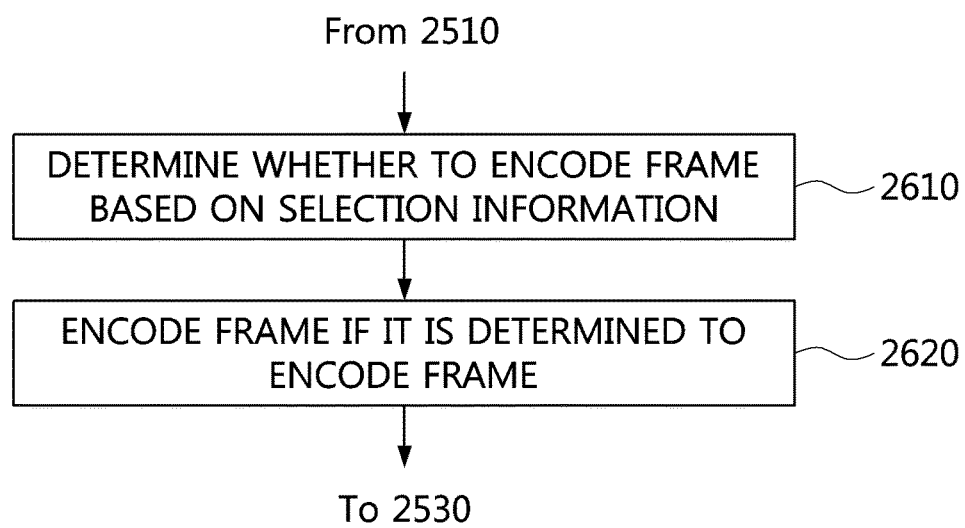
FIG. 26 is a flowchart showing a video encoding method according to an embodiment.

FIG. 26 is a flowchart showing a method for encoding a video according to an embodiment.

Step 2520, described above with reference to FIG. 25, may include the following steps 2610 and 2620.

At step 2610, the control unit 2410 may determine whether to encode the frame based on the selection information for the frame.

At step 2620, if it is determined to encode the frame, the encoding unit 2420 may encode the frame.

If it is determined to encode the frame, the control unit 2410 may request the encoding unit 2420 to encode the frame.

The determination of whether to encode the frame may be applied in common to other frames having the same TI as that of the frame, among multiple frames including the frame. Here, the multiple frames may be frames in a basic decision unit. Alternatively, the multiple frames may be frames in a GOP.

FIG. 27 is a configuration diagram of a decoding apparatus according to an embodiment.

A decoding apparatus 2700 may include a control unit 2710, a decoding unit 2720, and a communication unit 2730.

The communication unit 2730 may receive a bitstream from the encoding apparatus 2400.

The bitstream may include information about an encoded video. The encoded video information may include information about at least one encoded frame. The bitstream may include selection information for at least one frame.

The control unit 2710 may determine whether to decode the frame based on the selection information for the frame.

The control unit 2710 may perform a function applicable to decoding, among the functions of the above-described SURP 300. Alternatively, the control unit 2710 may include at least a portion of the SURP 300.

The decoding unit 2720 may correspond to the above-described decoding apparatus 200. For example, the function of the above-described decoding apparatus 200 may be performed by the decoding unit 2720. Alternatively, the decoding unit 2720 may include the decoding apparatus 200.

If it is determined to decode the frame, the decoding unit 2720 may decode the frame.

In an example, the decoding unit 2720 may decode all frames of the video.

In another example, the decoding unit 2720 may decode frames selected by the control unit 2710.

The functions and operations of the control unit 2710, the decoding unit 2720, and the communication unit 2730 will be described in detail below.

Figure 28:
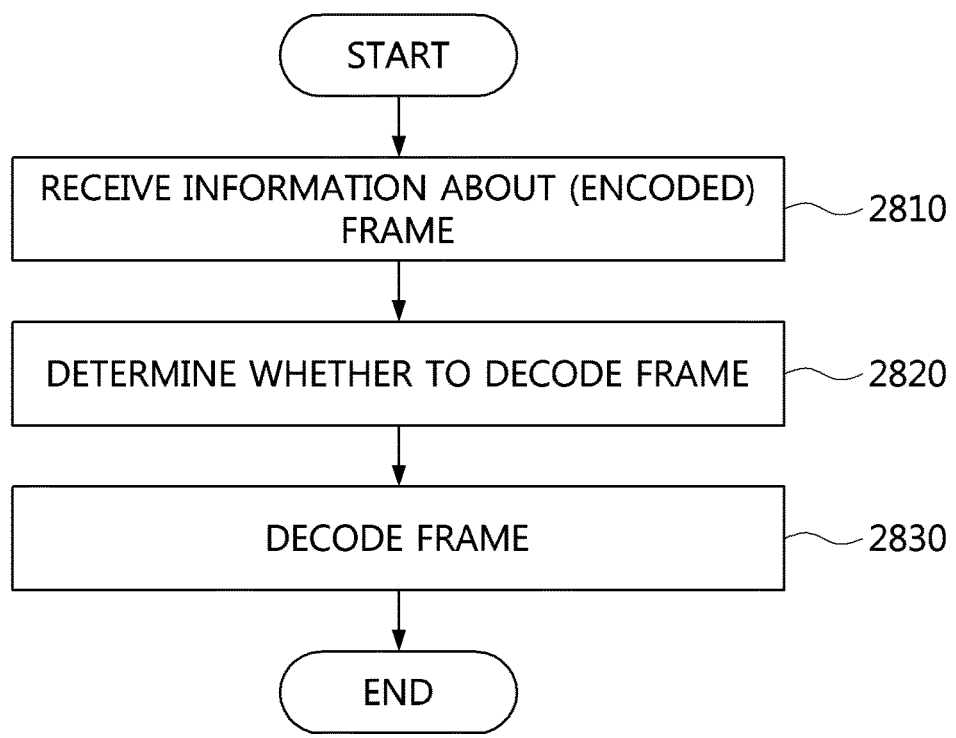
FIG. 28 is a flowchart showing a decoding method according to an embodiment.

FIG. 28 is a flowchart showing a decoding method according to an embodiment.

At step 2810, the communication unit 2730 may receive a bitstream. The communication unit 2730 may receive information about at least one encoded frame.

At step 2820, the control unit 2710 may determine whether to decode the frame based on selection information for the frame.

Such determination may be performed on each of the multiple frames of the video. Here, the multiple frames may be frames in a basic decision unit. Alternatively, the multiple frames may be frames in a GOP.

The selection information may correspond to the above-described satisfied user ratio information. Alternatively, the selection information may include the satisfied user ratio information.

In other words, each of the multiple frames of the video may have a temporal identifier (TI) and may also have satisfied user ratio information.

The selection information may be related to the proportion of persons who are unable to perceive the degradation of video quality even if the display of the video including a certain frame is determined such that the certain frame is excluded from decoding.

Alternatively, the selection information may be related to the proportion of persons who are unable to perceive the degradation of the quality of a displayed video even if FPS for the display of the video including a certain frame is determined such that the certain frame is excluded from decoding.

The selection information may be included in SEI for each frame.

Whether to decode the frame may be determined based on a comparison between the values of the selection information and display information.

The display information may be information related to the display of the video including the frame. The display information may correspond to a minimum satisfied user ratio. Alternatively, the display information may include the minimum satisfied user ratio.

The display information may be information related to FPS for the display of the video including the frame.

For example, when the value of the selection information is greater than that of the display information, the control unit 2710 may determine not to decode the frame. Alternatively, when the value of the selection information is equal to or greater than that of the display information, the control unit 2710 may determine to decode the frame.

Whether to perform decoding may be determined for each TI. If it is determined whether to perform decoding for a specific TI, it may be determined whether to decode frames including the TI. Alternatively, whether to perform decoding may be applied in common to other frames having the same TI as that of a certain frame, among multiple frames including the certain frame. The multiple frames may be frames in a basic decision unit. Alternatively, the multiple frames may be frames in a GOP The decoding apparatus 2700 may apply a TS function to the processing of frames which are determined to be decoded and frames which are excluded from decoding, among the multiple frames of the video. For example, the decoding apparatus 2700 may selectively receive information about frames which are determined to be decoded, among all the frames of the video, from the encoding apparatus 2400, and may display the frames which are determined to be decoded depending on the TS.

At step 2830, when it is determined to decode the corresponding frame, the decoding unit 2720 may decode the frame determined to be decoded.

The above description related to the improved TS may be applied to the decoding apparatus 2700 and steps 2810, 2820, and 2830.

In the above-described embodiments, although the methods have been described based on flowcharts as a series of steps or units, the present invention is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the invention.

The above-described embodiments according to the present invention may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

As described above, provided are a method and apparatus for predicting the degree of degradation of image quality in unit intervals when the frame rate of a unit interval is decreased for each unit interval of an HFR video.

Provided are a method and apparatus that are capable of reducing the data rate of a video by reducing a frame rate in each unit interval while maintaining perceptual quality in the range of image quality differences, input by the user, or the predefined range of allowable image quality differences, for each unit interval of an HFR video. For example, the predefined range of allowable image quality differences may be a range in which 80% or more of normal persons are unable to perceive the difference in image quality.

Provided are a method and apparatus that consider image quality degradation prediction information for predicting the degree of degradation of image quality upon the application of temporal scalability (TS).

Provided are a method and apparatus that apply TS only to a unit interval falling within the range of image quality degradation, input by the user, or a predefined image quality degradation range by considering the image quality degradation prediction information.

As described above, although the present invention has been described based on specific details such as detailed components and a limited number of embodiments and drawings, those are merely provided for easy understanding of the entire invention, the present invention is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present invention.

What is claimed is:

1. A video decoding method, comprising:
   determining whether to decode at least one frame based on selection information for the frame; and
   decoding the frame if it is determined to decode the frame based on a temporal identifier of the frame.

2. The video decoding method of claim 1, wherein:
   the determination is performed on each of multiple frames, and
   the multiple frames are frames in a Group Of Pictures (GOP).

3. The video decoding method of claim 1, wherein the selection information is related to a proportion of persons who are unable to perceive degradation of video quality even if display of a video including the frame is set such that the frame is excluded from decoding.

4. The video decoding method of claim 1, wherein the selection information is related to a proportion of persons who are unable to perceive degradation of video quality even if frames per second (FPS) for display of a video including the frame is determined such that the frame is excluded from decoding.

5. The video decoding method of claim 1, wherein:
   determining whether to decode the at least one frame is performed based on a comparison between a value of the selection information and a value of display information, and
   the display information is related to display of a video including the frame.

6. The video decoding method of claim 5, wherein the display information is related to FPS for display of the video including the frame.

7. The video decoding method of claim 1, wherein:
   if a value of the selection information is greater than a value of display information, it is determined not to decode the frame, and
   the display information is related to display of a video including the frame.

8. The video decoding method of claim 1, wherein the selection information is included in Supplemental Enhancement Information (SEI) for the frame.

9. The video decoding method of claim 1, wherein determining whether to decode the at least one frame is applied in common to additional frames having a temporal identifier identical to a temporal identifier of the frame, among multiple frames including the frame.

10. A video decoding apparatus, comprising:
a control unit for determining whether to decode at least one frame based on selection information for the frame; and
a decoding unit for decoding the frame if it is determined to decode the frame based on a temporal identifier of the frame.

11. A video encoding method, comprising:
generating selection information for at least one frame of a video; and
encoding the video based on the selection information based on a temporal identifier of the frame.

12. The video encoding method of claim 11, wherein encoding the video comprises:
determining whether to encode the frame based on the selection information for the frame; and
encoding the frame if it is determined to encode the frame.

13. The video encoding method of claim 12, wherein determining whether to encode the frame is applied in common to additional frames having a temporal identifier identical to the temporal identifier of the frame, among multiple frames including the frame.

14. The video encoding method of claim 11, wherein the selection information is related to a proportion of persons who are unable to perceive degradation of video quality even if the frame is excluded from encoding of the video.

15. The video encoding method of claim 14, wherein the proportion is calculated via machine learning.

16. The video encoding method of claim 14, wherein the proportion is determined based on a feature vector of the frame.

17. The video encoding method of claim 11, wherein the selection information includes multiple pieces of selection information, which are calculated for respective Frames Per Second (FPS) for display of the video.

18. The video encoding method of claim 11, wherein a bitstream generated by encoding the video includes the selection information.

19. The video encoding method of claim 11, wherein the selection information is applied in common to additional frames having a temporal identifier identical to the temporal identifier of the frame, among multiple frames including the frame.

20. The video encoding method of claim 11, wherein the selection information is related to a proportion of persons who are unable to perceive degradation of quality of a displayed video even if display of the video is set such that the frame is excluded from decoding.

* * * * *